(12) United States Patent
DelloStritto et al.

(10) Patent No.: US 8,543,999 B2
(45) Date of Patent: Sep. 24, 2013

(54) COMMUNICATION OF INFORMATION BETWEEN A PLURALITY OF NETWORK ELEMENTS

(75) Inventors: James J. DelloStritto, Jordan, NY (US); Ronald James Blaszak, Syracuse, NY (US); Song Yong Chung, Canton, GA (US); Chad Everett Craw, Fulton, NY (US); Albert Goldfain, Amherst, NY (US); Cory Russell Gondek, Tigard, OR (US); Frank LoMascolo, Auburn, NY (US); Mahesh Narayan, Syracuse, NY (US); Eric G. Petersen, Aloha, OR (US); Kenneth G. West, Aloha, OR (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 1089 days.

(21) Appl. No.: 11/663,395

(22) PCT Filed: Mar. 30, 2006

(86) PCT No.: PCT/US2006/011373
§ 371 (c)(1),
(2), (4) Date: Sep. 25, 2009

(87) PCT Pub. No.: WO2006/105139
PCT Pub. Date: Oct. 5, 2006

(65) Prior Publication Data
US 2010/0005448 A1   Jan. 7, 2010

Related U.S. Application Data

(60) Provisional application No. 60/667,203, filed on Mar. 30, 2005, provisional application No. 60/787,147, filed on Mar. 28, 2006.

(51) Int. Cl.
*G06F 9/445* (2006.01)

(52) U.S. Cl.
USPC ............ 717/176; 717/103; 717/114; 717/116

(58) Field of Classification Search
None
See application file for complete search history.

(56) References Cited

U.S. PATENT DOCUMENTS 4,631,666 A * 12/1986 Harris et al. ................. 709/217
5,261,080 A   11/1993 Khoyi et al.
(Continued)

FOREIGN PATENT DOCUMENTS

EP   0640913 A3   3/1995
EP   1407714 A1   4/2004
(Continued)

OTHER PUBLICATIONS

Title: A framework for real-time communication based object oriented industrial messaging services , author: Seinturier, L. et al, dated: 1999, source: IEEE.*

(Continued)

*Primary Examiner* — Chameli Das
(74) *Attorney, Agent, or Firm* — Merchant & Gould P.C.

(57) ABSTRACT

A communications protocol interface is configured as being divisible into a core portion and an extensible portion. The extensible portion of the communications protocol interface is further configured to be customized in scope so that each network element can communicate a unique and optionally small, subset of actual interoperable data that corresponds to at least a portion of a larger defined data set. A software generator program is configured to generate a set of extensible source code that operates upon the subset of actual data and that directs the execution of the extensible portion of the communications protocol interface for a particular network element.

23 Claims, 16 Drawing Sheets

(56) References Cited

U.S. PATENT DOCUMENTS

| | | | |
|---|---|---|---|
| 5,307,262 A | 4/1994 | Ertel | |
| 5,434,976 A * | 7/1995 | Tan et al. | 709/234 |
| 5,446,880 A | 8/1995 | Balgeman et al. | |
| 5,517,622 A | 5/1996 | Ivanoff | |
| 5,664,126 A | 9/1997 | Hirakawa | |
| 5,708,828 A | 1/1998 | Coleman | |
| 5,710,908 A | 1/1998 | Man | |
| 5,721,895 A | 2/1998 | Velissaropoulos et al. | |
| 5,724,580 A | 3/1998 | Levin | |
| 5,734,907 A | 3/1998 | Jarossay et al. | |
| 5,857,195 A | 1/1999 | Hayashi et al. | |
| 5,892,925 A | 4/1999 | Aditya et al. | |
| 5,999,979 A | 12/1999 | Vellanki et al. | |
| 6,026,392 A | 2/2000 | Kouchi et al. | |
| 6,050,940 A | 4/2000 | Braun | |
| 6,130,917 A | 10/2000 | Monroe | |
| 6,190,313 B1 | 2/2001 | Hinkle | |
| 6,193,654 B1 | 2/2001 | Richardson et al. | |
| 6,226,620 B1 | 5/2001 | Oon | |
| 6,249,668 B1 | 6/2001 | Abe et al. | |
| 6,250,309 B1 | 6/2001 | Krichen et al. | |
| 6,275,869 B1 | 8/2001 | Sieffert et al. | |
| 6,330,572 B1 | 12/2001 | Sitka | |
| 6,332,163 B1 | 12/2001 | Bowman-Amuah | |
| 6,400,286 B1 | 6/2002 | Cooper | |
| 6,496,851 B1 | 12/2002 | Morris | |
| 6,584,445 B2 | 6/2003 | Papageorge | |
| 6,616,606 B1 | 9/2003 | Peterson | |
| 6,625,617 B2 | 9/2003 | Yarnall et al. | |
| 6,633,833 B2 | 10/2003 | Sharma et al. | |
| 6,644,322 B2 | 11/2003 | Webb | |
| 6,651,104 B1 | 11/2003 | Moon | |
| 6,665,725 B1 | 12/2003 | Dietz | |
| 6,669,631 B2 | 12/2003 | Norris et al. | |
| 6,697,103 B1 | 2/2004 | Fernandez et al. | |
| 6,721,286 B1 | 4/2004 | Williams et al. | |
| 6,766,361 B1 | 7/2004 | Venigalla | |
| 6,779,004 B1 | 8/2004 | Zintel | |
| 6,792,431 B2 | 9/2004 | Tamboli et al. | |
| 6,801,331 B1 | 10/2004 | Motoyama | |
| 6,820,135 B1 | 11/2004 | Dingman | |
| 6,839,717 B1 | 1/2005 | Motoyama et al. | |
| 6,848,108 B1 | 1/2005 | Caron | |
| 6,915,312 B2 | 7/2005 | Bodnar et al. | |
| 6,940,807 B1 | 9/2005 | Rezvani et al. | |
| 6,942,616 B2 | 9/2005 | Kerr, II | |
| 6,951,539 B2 | 10/2005 | Bardy | |
| 6,978,422 B1 | 12/2005 | Bushe et al. | |
| 6,993,536 B2 | 1/2006 | Yamanaka | |
| 7,016,963 B1 | 3/2006 | Judd et al. | |
| 7,054,924 B1 | 5/2006 | Harvey et al. | |
| 7,065,579 B2 | 6/2006 | Traversat | |
| 7,124,299 B2 | 10/2006 | Dick et al. | |
| 7,136,927 B2 | 11/2006 | Traversat | |
| 7,181,508 B1 | 2/2007 | Sretenovic | |
| 7,200,671 B1 | 4/2007 | Lev-Ami | |
| 7,321,861 B1 | 1/2008 | Oon | |
| 7,340,500 B2 | 3/2008 | Traversat | |
| 7,360,154 B2 | 4/2008 | Gale | |
| 7,389,474 B2 | 6/2008 | Rettig et al. | |
| 7,392,255 B1 | 6/2008 | Sholtis | |
| 7,408,932 B2 | 8/2008 | Kounavis et al. | |
| 7,548,946 B1 * | 6/2009 | Saulpaugh et al. | 709/203 |
| 7,600,217 B2 * | 10/2009 | Dostert et al. | 717/114 |
| 7,653,227 B2 | 1/2010 | Krishnan | |
| 7,668,737 B2 | 2/2010 | Streepy, Jr. | |
| 7,698,383 B2 * | 4/2010 | Goring et al. | 709/219 |
| 7,725,606 B2 | 5/2010 | Lev-Ami | |
| 7,761,862 B2 * | 7/2010 | Gissel et al. | 717/166 |
| 7,783,637 B2 | 8/2010 | Bitsch | |
| 7,788,648 B2 | 8/2010 | Bossom | |
| 7,966,078 B2 | 6/2011 | Hoffberg | |
| 8,135,796 B1 * | 3/2012 | Slaughter et al. | 709/217 |
| 8,307,331 B2 * | 11/2012 | Warila et al. | 717/109 |
| 2001/0011222 A1 | 8/2001 | McLauchlin | |
| 2001/0023315 A1 | 9/2001 | Flach et al. | |
| 2001/0044809 A1 | 11/2001 | Parasnis et al. | |
| 2001/0052012 A1 | 12/2001 | Rinne | |
| 2002/0010797 A1 | 1/2002 | Moulton | |
| 2002/0013518 A1 | 1/2002 | West | |
| 2002/0023172 A1 | 2/2002 | Gendron et al. | |
| 2002/0037035 A1 | 3/2002 | Singh | |
| 2002/0072933 A1 | 6/2002 | Vonk et al. | |
| 2002/0099854 A1 | 7/2002 | Jorgensen | |
| 2002/0128862 A1 | 9/2002 | Lau | |
| 2002/0143824 A1 | 10/2002 | Lee et al. | |
| 2002/0165745 A1 * | 11/2002 | Greene et al. | 705/7 |
| 2002/0184384 A1 | 12/2002 | Simmon et al. | |
| 2003/0004403 A1 | 1/2003 | Drinan | |
| 2003/0037043 A1 | 2/2003 | Chang et al. | |
| 2003/0074248 A1 * | 4/2003 | Braud et al. | 705/9 |
| 2003/0093459 A1 | 5/2003 | Dowling | |
| 2003/0177035 A1 | 9/2003 | Oka | |
| 2003/0182626 A1 * | 9/2003 | Davidov et al. | 715/513 |
| 2003/0212982 A1 | 11/2003 | Brooks et al. | |
| 2003/0233250 A1 | 12/2003 | Joffe et al. | |
| 2004/0030763 A1 | 2/2004 | Manter | |
| 2004/0044545 A1 | 3/2004 | Wiesmann et al. | |
| 2004/0049522 A1 | 3/2004 | Streepy, Jr. | |
| 2004/0088374 A1 | 5/2004 | Webb et al. | |
| 2004/0123287 A1 * | 6/2004 | Fox et al. | 717/176 |
| 2004/0143677 A1 | 7/2004 | Novak | |
| 2004/0172442 A1 | 9/2004 | Ripley | |
| 2004/0176983 A1 | 9/2004 | Birkett et al. | |
| 2004/0215830 A1 | 10/2004 | Shenfield | |
| 2005/0004973 A1 * | 1/2005 | Snover et al. | 709/200 |
| 2005/0038326 A1 | 2/2005 | Mathur | |
| 2005/0054921 A1 | 3/2005 | Katsman et al. | |
| 2005/0071316 A1 | 3/2005 | Caron | |
| 2005/0071324 A1 | 3/2005 | Bitsch et al. | |
| 2005/0071486 A1 | 3/2005 | Vu et al. | |
| 2005/0091358 A1 | 4/2005 | Mehra et al. | |
| 2005/0125778 A1 | 6/2005 | Fleegal | |
| 2005/0154855 A1 | 7/2005 | Harris et al. | |
| 2005/0165947 A1 | 7/2005 | Auriemma et al. | |
| 2005/0198100 A1 * | 9/2005 | Goring et al. | 709/200 |
| 2005/0198364 A1 | 9/2005 | Val et al. | |
| 2005/0204022 A1 | 9/2005 | Johnston et al. | |
| 2005/0273772 A1 | 12/2005 | Matsakis | |
| 2006/0017563 A1 | 1/2006 | Rosenfeld et al. | |
| 2006/0052945 A1 | 3/2006 | Rabinowitz et al. | |
| 2006/0069605 A1 | 3/2006 | Hatoun | |
| 2006/0101109 A1 | 5/2006 | Nishio | |
| 2006/0111936 A1 | 5/2006 | Mahesh et al. | |
| 2006/0129435 A1 | 6/2006 | Smitherman et al. | |
| 2006/0129981 A1 * | 6/2006 | Dostert et al. | 717/114 |
| 2006/0143350 A1 * | 6/2006 | Miloushev et al. | 710/242 |
| 2006/0168513 A1 | 7/2006 | Coulson et al. | |
| 2006/0200259 A1 | 9/2006 | Hoffberg | |
| 2007/0016563 A1 | 1/2007 | Omoigui | |
| 2007/0027670 A1 | 2/2007 | Verhey-Henke | |
| 2007/0061393 A1 | 3/2007 | Moore | |
| 2007/0073872 A1 | 3/2007 | Wille | |
| 2007/0094548 A1 | 4/2007 | Lev-Ami | |
| 2007/0156726 A1 | 7/2007 | Levy | |
| 2007/0174323 A1 * | 7/2007 | Barcia et al. | 707/102 |
| 2007/0208865 A1 | 9/2007 | Morris | |
| 2008/0052384 A1 | 2/2008 | Marl et al. | |
| 2008/0082683 A1 | 4/2008 | DelloStritto et al. | |
| 2008/0133699 A1 | 6/2008 | Craw et al. | |
| 2008/0134133 A1 | 6/2008 | DelloStritto et al. | |
| 2008/0140770 A1 | 6/2008 | DelloStritto et al. | |
| 2009/0037514 A1 | 2/2009 | Lankford et al. | |
| 2010/0005448 A1 | 1/2010 | DelloStritto | |
| 2010/0274869 A1 * | 10/2010 | Warila et al. | 709/217 |
| 2011/0022748 A1 | 1/2011 | Edwards et al. | |
| 2011/0179405 A1 | 7/2011 | Dicks et al. | |
| 2011/0202824 A1 * | 8/2011 | Raje | 715/224 |
| 2012/0203873 A1 * | 8/2012 | Lewin et al. | 709/219 |

FOREIGN PATENT DOCUMENTS

| | | |
|---|---|---|
| WO | WO03/067842 A2 | 8/2003 |
| WO | WO2005/043386 A1 | 5/2005 |

| | | |
|---|---|---|
| WO | WO2005/067210 A1 | 7/2005 |
| WO | WO2006/105139 A2 | 10/2006 |
| WO | WO2008/045276 A2 | 4/2008 |

OTHER PUBLICATIONS

Title: Object-Based Message Ordering in Group Communication, author:Takayuki Tachikawa et al, source: IEEE, dated: 1997.*

Baird et al: "Communicating Data from Wireless Sensor Networks Using the HL7v3 Standard"; IEEE Computer Society; Proceedings of the International Workshop on Wearable and Implantable Body Sensor Networks; 183-186; Apr. 3, 2006; 4 pages.

Dolin et al: "HL7 Clinical Document Architecture, Release 2"; Journal of the American Medical Informatics Association, Hanley and Belfus, PA, US; vol. 13, No. 1; Jan. 1, 2006; 10 pages.

Helfenbein et al: "Philips Medical Systems Support for Open ECG and Standardization Efforts"; Computers in Cardiology 2004; 31:393-396; Chicago, IL; Sep. 19, 2004; 4 pages.

Norgall, Thomas: "ECG Data Interchange Formats and Protocols—Status and Outlook"; 2nd Open ECG Workshop 2004; Berlin, Germany; Apr. 1, 2004; accessed at: http://www.openecg.net/WS2_proceedings/Session05/S5.2_PA.pdf; retrieved on Jul. 11, 2008; 2 pages.

Ruiz et al: "An Open Standard Platform for Interoperability of Medical Devices"; Studies in Health Technology and Informatics, 1005-1009, IOS Press, Amsterdam, NL; Jan. 1, 2000; 6 pages.

WIPO Publication (WO 2008/045276 A3) of International Search Report for International Application No. PCT/US2007/021296, mailed Nov. 18, 2008 (9 pages).

Yao et al: "Applying the ISO/IEEE 11073 Standards to Wearable Home Health Monitoring Systems"; Journal of Clinical Monitoring and Computing vol. 19 No. 6: 427-436; Dec. 1, 2005; 10 pages.

International Search Report & Written Opinion for PCT/US2006/011373, dated Feb. 6, 2008.

* cited by examiner

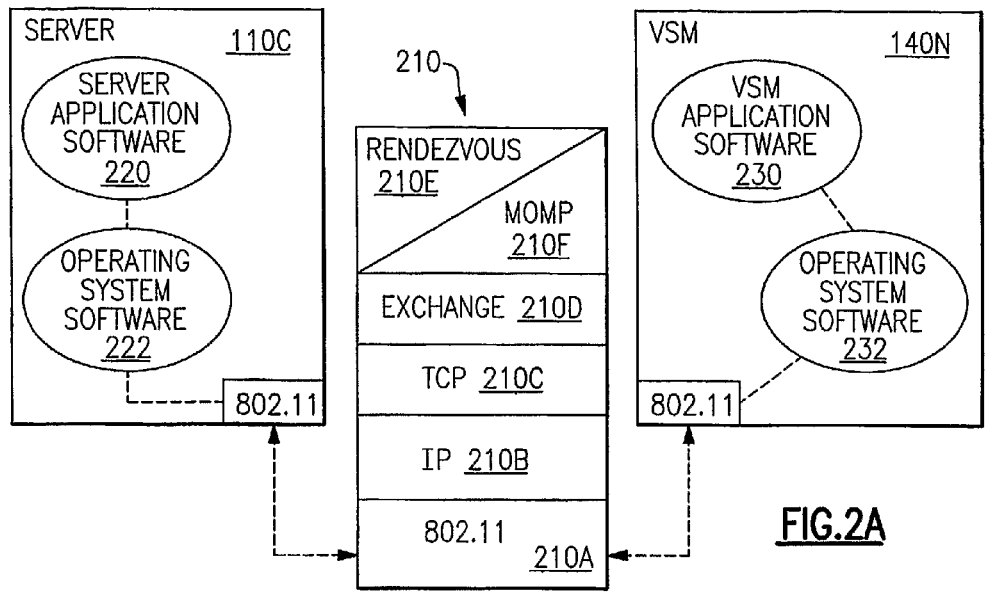
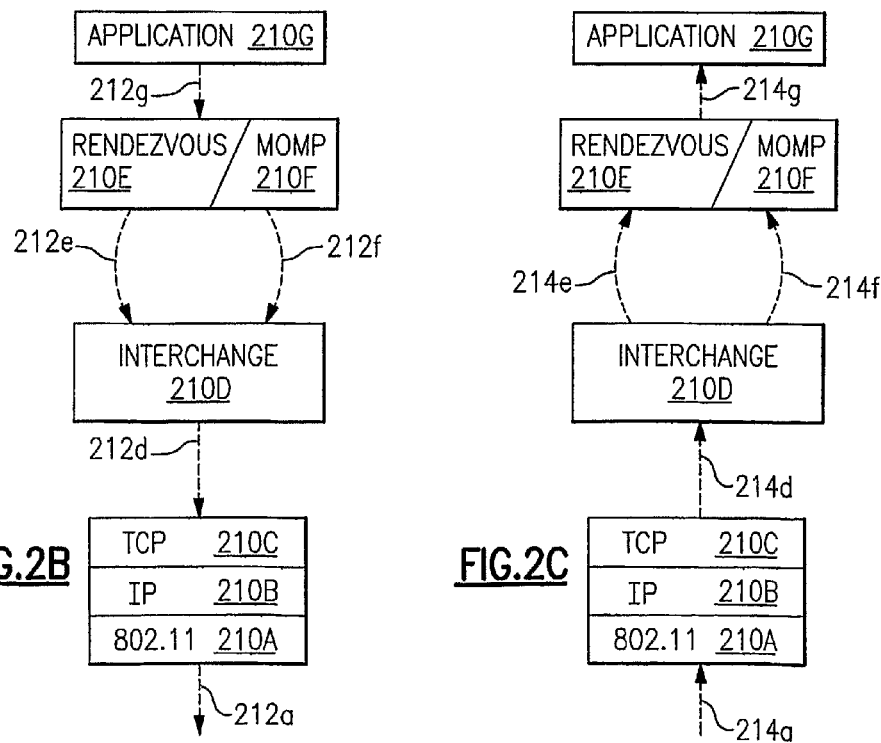

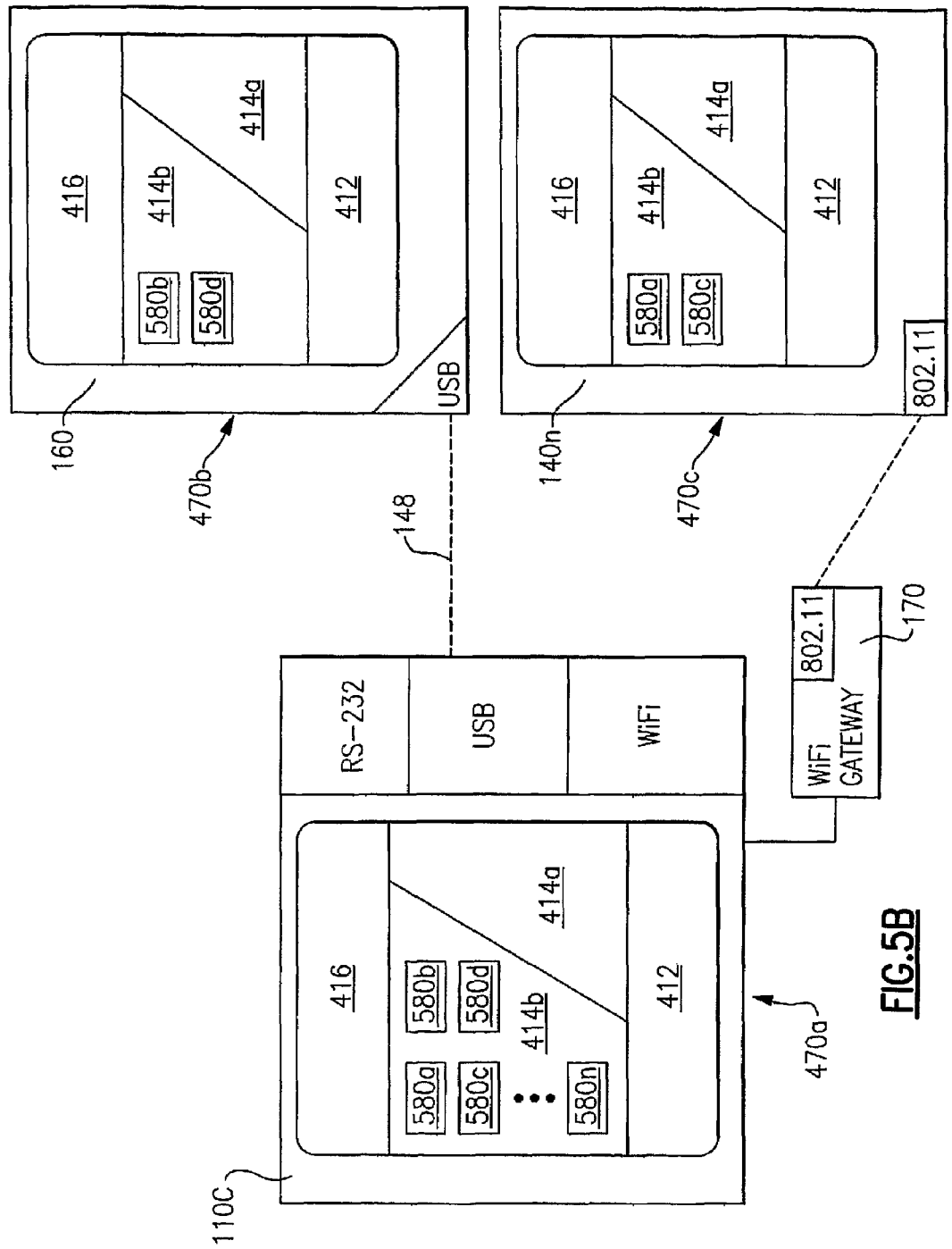

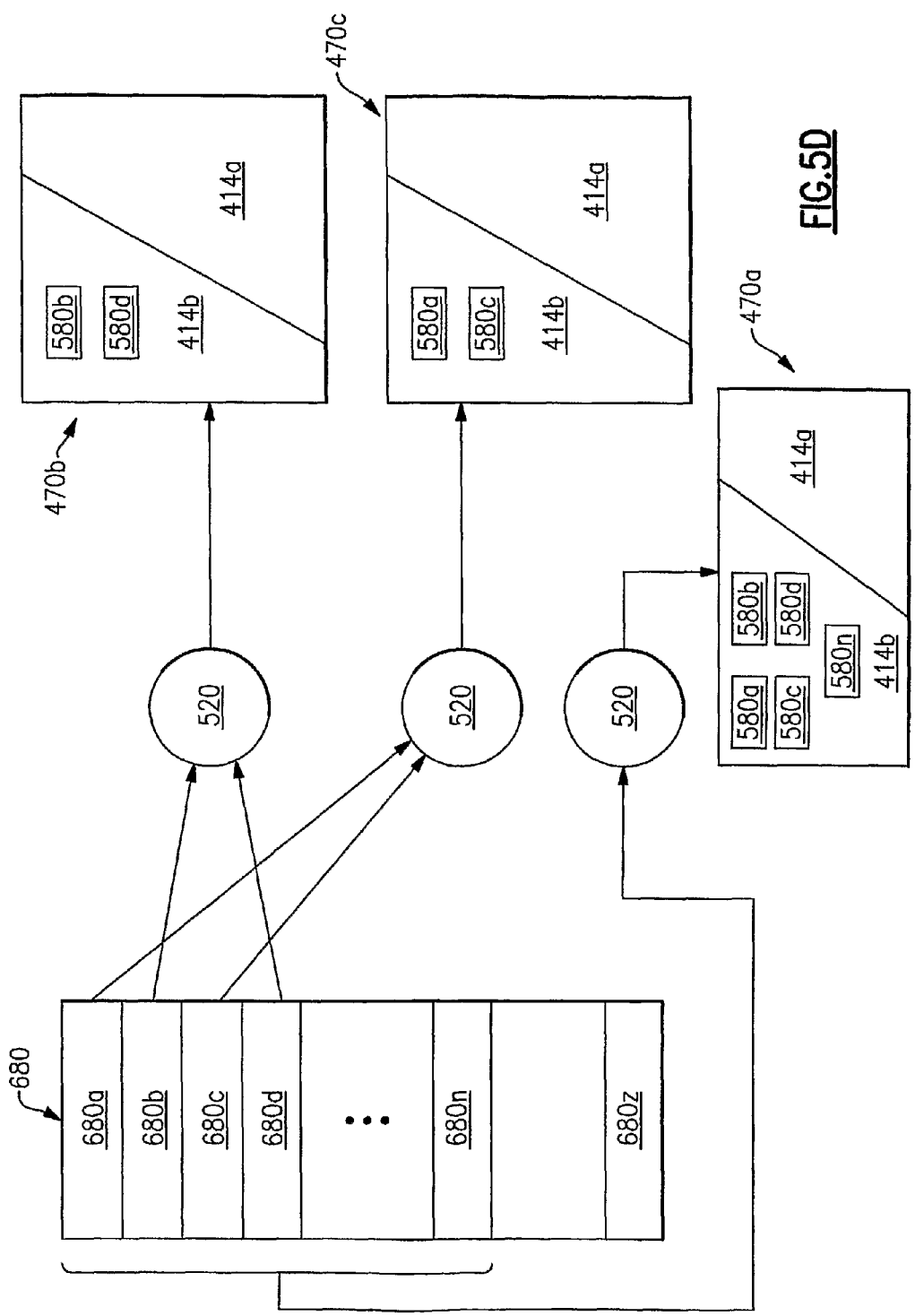

```
<?xml version="1.0" encoding="ISO-8859-1" ?>    612
- <DDS_DEMO>    614
  + <FAMILY_NIBP>    616
  + <FAMILY_ERROR>    618
  + <FAMILY_BATTERY>    620
  + <FAMILY_DTCOLLECTION>    622
  + <FAMILY_WAVE>    624
  </DDS_DEMO>
```

FIG. 6A    610

```
<?xml version="1.0" encoding="ISO-8859-1" ?>
- <DDS_DEMO>
- <FAMILY_NIBP>    616
  + <SPECIES_KEY>    630
632 + <CNIBPDSTD_DEFINITION class="CNIBPDStd" abrv="CNBPDSTD" version="105"
       family="FmNIBP" genus="GnDATA" species="SpSTANDARD">
634 + <CNIBPCSTD_DEFINITION class="CNIBPCStd" abrv="CNBPCSTD" version="102"
       family="FmNIBP" genus="GnCONFIG" species="SpSTANDARD">
636 + <MESSAGES>
    </FAMILY_NIBP>    638
618 + <FAMILY_ERROR>
620 + <FAMILY_BATTERY>
622 + <FAMILY_DTCOLLECTION>
624 + <FAMILY_WAVE>
    </DDS_DEMO>
```

FIG. 6B

```xml
<?xml version="1.0" encoding="ISO-8859-1" ?>
- <DDS_DEMO>
- <FAMILY_NIBP>
+ <SPECIES_KEY>
+ <CNIBPDSTD_DEFINITION class="CNIBPDStd" abrv="CNIBPDSTD" version="105"
    family="FmNIBP" genus="GnDATA" species="SpSTANDARD">
+ <CNIBPCSTD_DEFINITION class="CNIBPCStd" abrv="CNIBPCSTD" version="102"
    family="FmNIBP" genus="GnCONFIG" species="SpSTANDARD">
636 — <MESSAGES>
642a — <MSG type="Request" name="GET_BP" description="Get BP" />
642b — <MSG type="Request" name="GET_CONFIG" description="Get BP Config" />
642c — <MSG type="Response" name="PUT_BP" description="Put BP" />
642d — <MSG type="Response" name="PUT_CONFIG" description="Put BP Config" />
642e — <MSG type="Command" name="START_NIBP" description="Start BP Cycle" />
642f — <MSG type="Command" name="STOP_NIBP" description="Stop BP Cycle" />
642g — <MSG type="Command" name="WRITE_CONFIG" description="Write Config" />
642h — <MSG type="Status" name="REPORT_BP" description="Report BP" />
   </MESSAGES>
  </FAMILY_NIBP>
+ <FAMILY_ERROR>
+ <FAMILY_BATTERY>
+ <FAMILY_DTCOLLECTION>
+ <FAMILY_WAVE>
  </DDS_DEMO>
```

FIG.6C

```xml
<?xml version="1.0" encoding="ISO-8859-1" ?>
- <DDS_DEMO>
  - <FAMILY_NIBP>
    + <CNIBPDSTD_DEFINITION class="CNIBPDStd" abrv="CNBPDSTD" version="105"
        family="FmNIBP" genus="GnDATA" species="SpSTANDARD">
    - <CNIBPCSTD_DEFINITION class="CNIBPCStd" abrv="CNBPCSTD" version="102"
        family="FmNIBP" genus="GnCONFIG" species="SpSTANDARD">
      - <STATIC_MEMBERS>
          <VAR type="uint16" name="DisplayUnits" comment="Display units for BP and MAP" />
          <VAR type="boolean" name="MAPDisplay" comment="MAP Display enabled/disabled" />
        </STATIC_MEMBERS>
        <ENUMERATIONS>
          <ENUM type="DisplayUnits" name="NIBP_MMHG" defaultvalue="0" description="mmHg" />
          <ENUM type="DisplayUnits" name="NIBP_KPA" description="kPa" />
          <ENUM type="MAPDisplay" name="DISABLE" defaultvalue="0" description="MAP display disabled" />
          <ENUM type="MAPDisplay" name="ENABLE" description="MAP display enabled" />
          <ENUM type="Species" name="STANDARD" defaultvalue="0" description="NIBP Standard Configuration" />
        </ENUMERATIONS>
      </CNIBPCSTD_DEFINITION>
    + <MESSAGES>
    </FAMILY_NIBP>
  + <FAMILY_ERROR>

+ <FAMILY_BATTERY>

+ <FAMILY_DTCOLLECTION>
  + <FAMILY_WAVE>
  </DDS_DEMO>
```

FIG.6D

```xml
<?xml version="1.0" encoding="ISO-8859-1" ?>
- <DDS_DEMO>    -616
    <FAMILY_NIBP>
632-<CNIBPDSTD_DEFINITION class="CNIBPDStd" abrv="CNBPDSTD" version="105"
654-    family="FmNIBP" genus="GnDATA" species="SpSTANDARD">
    -<STATIC_MEMBERS>
        <VAR type="TIME" name="STime" comment="Time reading was taken" />
        <VAR type="uint16" name="Status" comment="DATA_NOT_AVAIL,
            DATA_AVAIL, etc" />
        <VAR type="int16" name="Systolic" comment="Systolic BP {in 0.01 mmHg
            units}" />
        <VAR type="int16" name="Diastolic" comment="Diastolic BP {in 0.01 mmHg
            units}" />
        <VAR type="int16" name="MAP" comment="Mean Arterial Pressre {in 0.01
            mmHg units}" />
        <VAR type="uint16" name="HR" comment="NIBP Heart Rate (in BPM
            (Beats/Minute) units}" />
        <VAR type="uint16" name="ExtStatus" member="NUMERIC" />
        <VAR type="uint16" name="Source" comment="Source of data" />
        <VAR type="uint8" name="Mode" comment="Mode of operation" />
        <VAR type="uint8" name="Method" comment="Method used" />
660-    </STATIC_MEMBERS>
    - <ENUMERATIONS>
        <ENUM type="Status" name="DATA_NOT_AVAIL" defaultvalue="0"
            description="Data Not Available" />
        <ENUM type="Status" name="DATA_COMPLETE" description="Data Available" />
        <ENUM type="Status" name="DATA_FAILURE" description="Data Failure" />
        </ENUMERATIONS>
        </CNIBPDSTD_DEFINITION>
    + <CNIBPDSTD_DEFINITION class="CNIBPCStd" abrv="CNBPCSTD" version="102"
        family="FmNIBP" genus="GnCONFIG" species="SpSTANDARD">
    + <MESSAGES>
        </FAMILY_NIBP>
    + <FAMILY_ERROR>
    + <FAMILY_BATTERY>
    + <FAMILY_DTCOLLECTION>
    + <FAMILY_WAVE>
    </DDS_DEMO>
```

FIG.6E

COMMUNICATION OF INFORMATION BETWEEN A PLURALITY OF NETWORK ELEMENTS

CROSS-REFERENCE TO RELATED APPLICATIONS

This application claims priority to U.S. Provisional Patent Application Ser. No. 60/667,203, filed Mar. 30, 2005 and claims priority to U.S. Provisional Patent Application 60/787,147, filed Mar. 28, 2006 and titled "System For Communicating Information Between A Plurality of Network Elements". All of the aforementioned patent applications are incorporated by reference in their entirety. A computer program listing appendix is also incorporated herein by reference.

FIELD OF THE INVENTION

This invention relates generally to method, apparatus and system for the communication of information among a plurality of network elements, and specifically to a communications protocol interface and apparatus, having a core and an extensible set of functionality, that is configured to communicate a potentially large and varied set of defined data, including physiological and health care related data. Software implementing the communications protocol interface is configurable from a set of extensible markup language (XML) directives and is generated from a software generator program in response to the directives.

Computer Program Listing Appendix

Enclosed with the specification are two (2) compact discs (Copy 1 and Copy 2) which are identical. The files recorded on each of the attached compact discs (Copy 1 and Copy 2) represent a computer program listing appendix and are incorporated herein by reference. Listed below are the files recorded on each compact disc including their names and size in units of bytes.

The files that are listed immediately below and indexed with numbers 1-42 are located in a folder named "Demo". These files are all C++ source code files created on Mar. 27, 2006.

| Demo | |
|---|---|
| 1) File Name: CBatteryDStd.cpp | Size: 38 KB |
| 2) File Name: CColDWave.cpp | Size: 44 KB |
| 3) File Name: CErrEStd.cpp | Size: 41 KB |
| 4) File Name: CErrPGetError.cpp | Size: 35 KB |
| 5) File Name: CFmBATTERYcom.cpp | Size: 14 KB |
| 6) File Name: CFmBATTERYStub.cpp | Size: 17 KB |
| 7) File Name: CFmDTCOLLECTIONcom.cpp | Size: 16 KB |
| 8) File Name: CFmDTCOLLECTIONStub.cpp | Size: 19 KB |
| 9) File Name: CFmERRORcom.cpp | Size: 12 KB |
| 10) File Name: CFmERRORStub.cpp | Size: 13 KB |
| 11) File Name: CFmNIBPcom.cpp | Size: 16 KB |
| 12) File Name: CFmNIBPStub.cpp | Size: 21 KB |
| 13) File Name: CFmWAVEcom.cpp | Size: 16 KB |
| 14) File Name: CFmWAVEStub.cpp | Size: 23 KB |
| 15) File Name: CNIBPCStd.cpp | Size: 34 KB |
| 16) File Name: CNIBPDStd.cpp | Size: 47 KB |
| 17) File Name: CWACPApp.cpp | Size: 21 KB |
| 18) File Name: CWACPPres.cpp | Size: 15 KB |
| 19) File Name: CWACPStub.cpp | Size: 27 KB |
| 20) File Name: CWaveCStd.cpp | Size: 39 KB |
| 21) File Name: CWaveDStd.cpp | Size: 40 KB |
| 22) File Name: CBatteryDStd.h | Size: 8 KB |
| 23) File Name: CColDWave.h | Size: 7 KB |
| 24) File Name: CErrEStd.h | Size: 8 KB |
| 25) File Name: CErrPGetError.h | Size: 7 KB |
| 26) File Name: CFmBATTERYcom.h | Size: 7 KB |
| 27) File Name: CFmBATTERYStub.h | Size: 3 KB |
| 28) File Name: CFmDTCOLLECTIONcom.h | Size: 7 KB |
| 29) File Name: CFmDTCOLLECTIONStub.h | Size: 3 KB |
| 30) File Name: CFmERRORcom.h | Size: 6 KB |
| 31) File Name: CFmERRORStub.h | Size: 3 KB |
| 32) File Name: CFmNIBPcom.h | Size: 7 KB |
| 33) File Name: CFmNIBPStub.h | Size: 3 KB |
| 34) File Name: CFmWAVEcom.h | Size: 7 KB |
| 35) File Name: CFmWAVEStub.h | Size: 3 KB |
| 36) File Name: CNIBPCStd.h | Size: 8 KB |
| 37) File Name: CNIBPDStd.h | Size: 10 KB |
| 38) File Name: CWACPApp.h | Size: 13 KB |
| 39) File Name: CWACPPres.h | Size: 5 KB |
| 40) File Name: CWACPStub.h | Size: 4 KB |
| 41) File Name: CWaveCStd.h | Size: 8 KB |
| 42) File Name: CWaveDStd.h | Size: 8 KB |

The files that are listed immediately below and indexed with numbers 43-45 are also located in a folder named "Demo". These files are extensible markup language (XML) files and were created on Mar. 27, 2006.

| Demo | |
|---|---|
| 43) File Name: DDS_DEMO.xml | Size: 25 KB |
| 44) File Name: DDS_SPOT_ULTRA.xml | Size: 124 KB |
| 45) File Name: DDS_VALIDATION.xml | Size: 16 KB |

The files that are listed immediately below and indexed with numbers 1-63 are located in a folder named "Demo\ANSI_CPP\Win32". These files are C++ source code files and were created on Mar. 27, 2006.

| Demo\ANSI_CPP\Win32 | |
|---|---|
| 1) File Name: AESCrypt.cpp | Size: 14 KB |
| 2) File Name: CAESWrapper.cpp | Size: 3 KB |
| 3) File Name: CBootEntry.cpp | Size: 11 KB |
| 4) File Name: CCommSvr.cpp | Size: 20 KB |
| 5) File Name: CConObjSvr.cpp | Size: 29 KB |
| 6) File Name: CDLLEntry.cpp | Size: 13 KB |
| 7) File Name: CEncryption.cpp | Size: 3 KB |
| 8) File Name: CError.cpp | Size: 23 KB |
| 9) File Name: CErrSvr.cpp | Size: 19 KB |
| 10) File Name: CEthCommSvr.cpp | Size: 34 KB |
| 11) File Name: CFmRNDZObjSvr.cpp | Size: 12 KB |
| 12) File Name: CFmRouter.cpp | Size: 7 KB |
| 13) File Name: CLinkTable.cpp | Size: 12 KB |
| 14) File Name: CMsgSvr.cpp | Size: 11 KB |
| 15) File Name: CRNDZStub.cpp | Size: 13 KB |
| 16) File Name: CSerialCommSvr.cpp | Size: 33 KB |
| 17) File Name: CTraceSvr.cpp | Size: 18 KB |
| 18) File Name: CTrapObjSvr.cpp | Size: 21 KB |
| 19) File Name: CUSBCommSvr.cpp | Size: 17 KB |
| 20) File Name: CWACPEvent.cpp | Size: 4 KB |
| 21) File Name: CWACPMutex.cpp | Size: 3 KB |
| 22) File Name: CWACPSemaphore.cpp | Size: 3 KB |
| 23) File Name: CWACPThread.cpp | Size: 3 KB |
| 24) File Name: Dt.cpp | Size: 5 KB |
| 25) File Name: DtData.cpp | Size: 35 KB |
| 26) File Name: Mem.cpp | Size: 17 KB |
| 27) File Name: MiscUtil.cpp | Size: 4 KB |
| 28) File Name: SysUtil.cpp | Size: 8 KB |
| 29) File Name: AESCrypt.h | Size: 2 KB |
| 30) File Name: CAESWrapper.h | Size: 2 KB |

-continued

| Demo\ANSI_CPP\Win32 | |
|---|---|
| 31) File Name: CBootEntry.h | Size: 3 KB |
| 32) File Name: CCommSvr.h | Size: 4 KB |
| 33) File Name: CConObjSvr.h | Size: 7 KB |
| 34) File Name: CDLLEntry.h | Size: 8 KB |
| 35) File Name: CEncryption.h | Size: 2 KB |
| 36) File Name: CError.h | Size: 7 KB |
| 37) File Name: CErrSvr.h | Size: 5 KB |
| 38) File Name: CEthCommSvr.h | Size: 5 KB |
| 39) File Name: CFmRNDZObjSvr.h | Size: 6 KB |
| 40) File Name: CFmRouter.h | Size: 4 KB |
| 41) File Name: CLinkTable.h | Size: 3 KB |
| 42) File Name: CMOMPCallbacks.h | Size: 3 KB |
| 43) File Name: CMsgSvr.h | Size: 4 KB |
| 44) File Name: CObjSvr.h | Size: 3 KB |
| 45) File Name: Common.h | Size: 5 KB |
| 46) File Name: CRNDZStub.h | Size: 4 KB |
| 47) File Name: CSerialCommSvr.h | Size: 5 KB |
| 48) File Name: CTraceSvr.h | Size: 12 KB |
| 49) File Name: CTrapObjSvr.h | Size: 5 KB |
| 50) File Name: CUSBCommSvr.h | Size: 4 KB |
| 51) File Name: CWACPEvent.h | Size: 2 KB |
| 52) File Name: CWACPMutex.h | Size: 2 KB |
| 53) File Name: CWACPSemaphore.h | Size: 2 KB |
| 54) File Name: CWACPThread.h | Size: 2 KB |
| 55) File Name: Dt.h | Size: 5 KB |
| 56) File Name: DtData.h | Size: 13 KB |
| 57) File Name: DtSupport.h | Size: 5 KB |
| 58) File Name: Mem.h | Size: 4 KB |
| 59) File Name: MiscUtil.h | Size: 2 KB |
| 60) File Name: StdVarTyp.h | Size: 6 KB |
| 61) File Name: SysUtil.h | Size: 5 KB |
| 62) File Name: target.h | Size: 6 KB |
| 63) File Name: xmlparse.h | Size: 21 KB |

The file that is listed immediately below and indexed with number 64 are located in a folder named "Demo\ANSI_CPP\Win32". These files are listed along with their separate file type information and were created on Mar. 27, 2006.

| Demo\ANSI_CPP\Win32 | |
|---|---|
| 64) File Name: CDLLEntry.def<br>File type: dynamic link library export file | Size: 1 KB |

The files that are listed immediately below and indexed with numbers 1-2 are located in a folder named "Demo\ANSI_CPP\Win32\Client". These files are C++ source code files and were created on Mar. 27, 2006.

| Demo\ANSI_CPP\Win32\Client | |
|---|---|
| 1) File Name: CInterchange.cpp | Size: 38 KB |
| 2) File Name: CInterchange.h | Size: 6 KB |

The files that are listed immediately below and indexed with numbers 1-2 are located in a folder named "Demo\ANSI_CPP\Win32\Server". These files are C++ source code files and were created on Mar. 27, 2006.

| Demo\ANSI_CPP\Win32\Server | |
|---|---|
| 1) File Name: CInterchange.cpp | Size: 60 KB |
| 2) File Name: CInterchange.h | Size: 8 KB |

The file that is listed immediately below and indexed with number 1 is located in a folder named "Demo\Release Files". This file is an extensible markup language (XML) file and was created on Mar. 27, 2006.

| Demo\Release Files | |
|---|---|
| 1) File Name: DDS_SPOT_ULTRA.xml | Size: 124 KB |

The files that are listed immediately below and indexed with numbers 1-3 are located in a folder named "Demo\VC71_CPP_CLIENT". These files are listed along with their separate file type information and were created on Mar. 27, 2006.

| Demo\VC71_CPP_CLIENT | |
|---|---|
| 1) File Name: TraceTransform.xsl<br>File type: XML transform file | Size: 7 KB |
| 2) File name: VC71_CPP_CLIENT.sln<br>File type: Visual studio solution file for C++ | Size: 1 KB |
| 3) File name: VC71_CPP_CLIENT.vcproj<br>File type: Visual studio project file for C++ | Size: 12 KB |

The files that are listed immediately below and indexed with numbers 1-3 are located in a folder named "Demo\VC71_CPP_SERVER". These files are listed along with their separate file type information and were created on Mar. 27, 2006.

| Demo\VC71_CPP_SERVER | |
|---|---|
| 1) File Name: TraceTransformer.xsl<br>File type: XML transform file | Size: 7 KB |
| 2) File name: VC71_CPP_SERVER.sln<br>File type: Visual studio solution file for C++ | Size: 1 KB |
| 3) File name: VC71_CPP_SERVER.vcproj<br>File type: Visual studio project file for C++ | Size: 11 KB |

BACKGROUND OF THE INVENTION

Some computing environments involve acquiring and communicating a collection of data that includes a large volume and variety of associated data definitions, and that is subject to change and evolve over time. The acquisition and communication of physiological data within a health care environment is an example of such a computing environment.

A health care computing environment typically includes a variety of devices that process physiological data and that communicate via a network. These devices typically include software and can be configured to operate upon a particular subset of the physiological and other data. The particular subset of physiological data can be unique to a group of one or more devices and there can be an overlap between the particular subset of physiological data that is processed by each group of devices.

The design of each device is dependent upon a particular subset of physiological data that the device processes and communicates. The design of the software residing on the device is likewise dependent upon the subset of physiological data that the device processes and communicates.

As a result, a substantial effort can be required to design, implement and maintain over time, software that acquires and communicates physiological and/or other types of similar data. Further substantial effort can be required where the software is developed to execute on a plurality of devices that each operate upon a unique and particular subset of the data, characterized by a particular set of data types and associated data definitions. Also, further substantial effort can be required where the data including the data types and associated data definitions are subject to change and evolve over time.

Because software reliability is critical to providing adequate health care, even further substantial effort is required where the software operates upon data within a health care environment. Lack of reliable software within a health care environment can interfere with providing adequate health care and can harm or even kill health care patients.

SUMMARY OF THE INVENTION

This invention generally provides for a method, apparatus and system for communicating information among a plurality of network elements, and specifically provides a communications protocol interface and associated apparatus, having a core and an extensible set of functionality, that is configured to communicate a potentially large and varied set of defined data, including physiological and health care related data.

In some embodiments, software implementing the communications protocol interface is configurable from a set of extensible markup language (XML) directives and is generated by a software generator program in response to inputting and the directives. In some embodiments, the communications protocol interface can also be apportioned in scope so that each network element can communicate a unique subset of data, included within a larger defined data set, according to the particular function of the network element.

The foregoing and other objects, aspects, features, and advantages of the invention will become more apparent from the following description and from the claims.

BRIEF DESCRIPTION OF THE DRAWINGS

The objects and features of the invention can be better understood with reference to the claims and drawings described below. The drawings are not necessarily to scale, the emphasis is instead being placed upon generally illustrating the principles of the invention. Within the drawings, like reference numbers are used to indicate like parts throughout the various views. Differences between like parts may cause those parts to be indicated by different reference numbers. Unlike parts are indicated by different reference numbers.

FIG. 2A is a block diagram illustrating a representation of internal software components and a communications protocol interface residing within the vital signs measuring (VSM) device and the host 110*c*, as shown in FIG. 1.

FIG. 2B is a block diagram that illustrates receiving information from another network element through the communications interface.

FIG. 2C is a block diagram that illustrates receiving information through the communications interface.

FIG. 5B is a block diagram illustrating the different configurations of WACP CPI software that are installed onto a plurality of interoperating network elements.

FIG. 5D illustrates portions of a global set of directives being built into different configurations.

FIG. 6A illustrates a set of directives that define a plurality of extended modules and that are encoded in Extensible Markup Language (XML).

FIG. 6B illustrates the set of directives of FIG. 6A including XML element tags that are nested one level below the <FAMILY_NIBP> element.

FIG. 6C illustrates XML element tags that are located one level below the <MESSAGES> element of the <FAMILY_NIBP> element of the set of directives of FIG. 6A.

FIG. 6D illustrates XML element tags that are located one level below the <CNIBPCSTD_DEFINITION> element of the <FAMILY_NIBP> element of the set of directives of FIG. 6A.

FIG. 6E illustrates some of the XML element tags that are located one level below the <CNIBPDSTD_DEFINITION> element of the <FAMILY_NIBP> element of the set of directives of FIG. 6A.

DETAILED DESCRIPTION OF THE INVENTION

Figure 1:
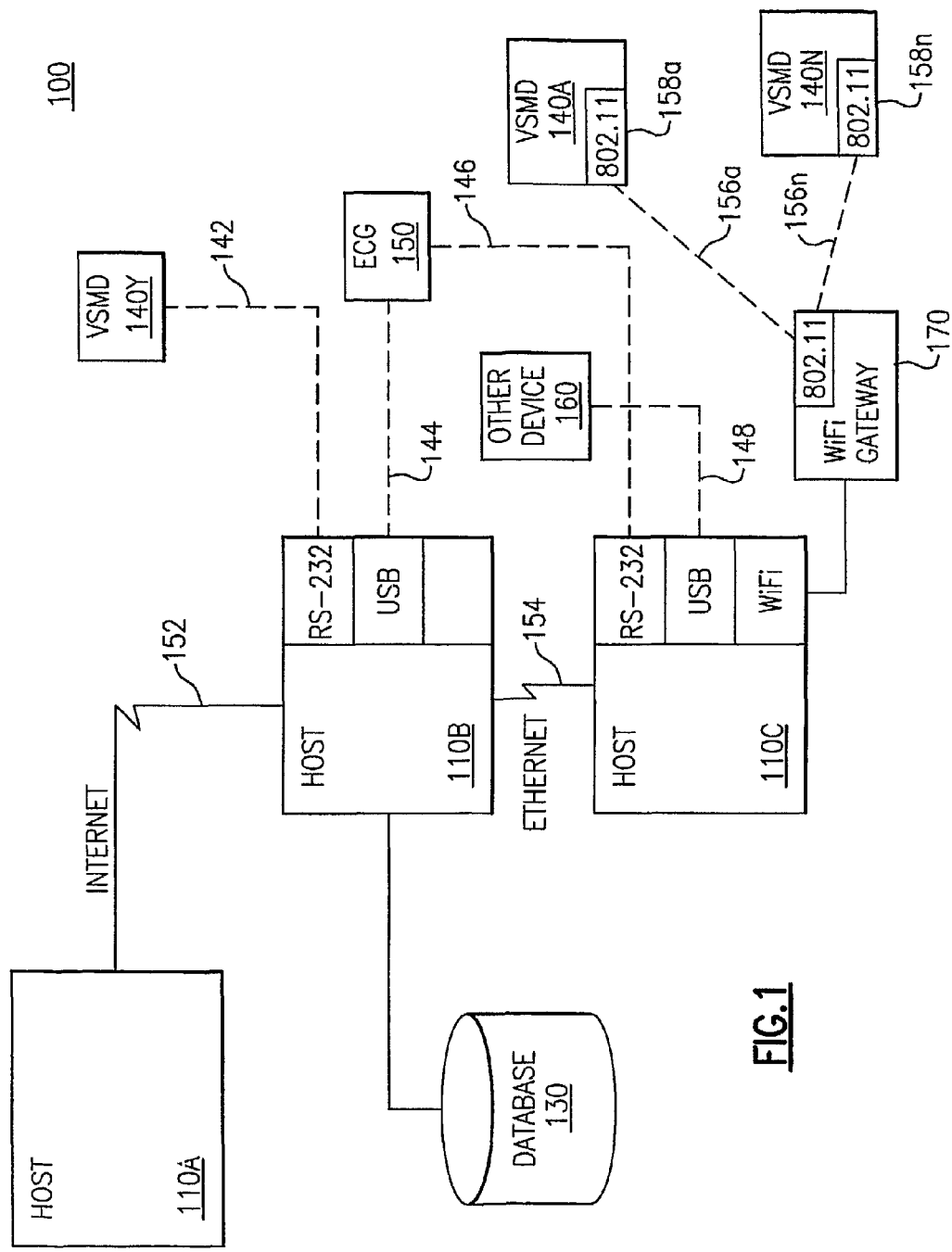
FIG. 1 is a block diagram illustrating various network elements located within health care (medical) information system.

FIG. 1 is a block diagram illustrating various network elements located within health care (medical) information system 100. The network elements, including host (server) computers 110A-110C, vital signs measuring devices (VSMD) 140A-140Y, electrocardiogram (ECG) devices 150 and other devices 160, constitute nodes within a network and perform a variety of different functions within the system 100.

The host computers 110A-110C, are typically stationary (non-mobile) devices that accommodate a variety of optional hardware including hard disk drives, RAM memory cards and communication interface hardware to support Ethernet, WIFI, USB and serial communications interfaces with other network elements, for example.

Vital signs measuring devices (VSMD) 140A-140Y are devices that are used by operators to perform various vital sign related physiological measurements of a patient. For example, a VSMD 140A-140Y can measure systolic and diastolic pressure, mean arterial pressure, pulse rate, temperature and pulse oximetry (SpO2) of adult and pediatric patients. A VSMD 140A-140Y can typically communicate to other devices, including a server computer 110A-110C, via an RS-232 serial interface, a universal serial bus (USB) interface or via WiFi (wireless) (802.11) communications interface.

In one type of embodiment, the VSMD 140A-140Y is a Welch Allyn Spot LXi vital signs measuring device (VSMD). In this embodiment, the Spot LXi VSMD 140A-140N optionally uses a wireless adapter 158a-158n to wirelessly (WiFi) communicate via 802.11 communications channel 156a-156n to another 802.11 type of communicating device, such as to the host computer 110C, via a WiFi gateway 170. The Spot LXi VSMD 140Y also communicates via RS-232 serial communications channel 142 to host computer 110B.

Also, other devices, for example an ECG measurement device 150, can communicate via a USB communications channel 144 to the host computer 110B or communicate via RS-232 serial communications channel 146 to host computer 110C. As shown, another device 160 can communicate via a USB communications channel 148 to the host computer 110C.

The host computer 110B can also communicate with another remotely located host computer 110A via an Internet communications channel 152 or communicate with another host computer 110C, via an Ethernet local area network communications channel 154. The host computer 110B is directly connected to a database 130 that functions as a repository of data. The database 130 stores and processes data captured and processed by the system 100. Much of the data of the medical information system is defined and structured to represent numerous measurements of human physiology for a population of patients.

FIG. 2A is a block diagram illustrating a representation of internal software components and a communications protocol interface residing within the vital signs measuring device (VSMD) and the host computer 110c, as shown in FIG. 1.

The representation of the communications interface 210 includes a layering (stack) of communications protocols, also referred to herein as a protocol stack, that is exercised between the VSMD 140N and the host computer 110c. Each communications protocol is implemented as executing software within the communications protocol interface 210 for each network element, such as the VSMD 140N and the host computer 110C, and operates in accordance with a communications protocol interface (CPI) specification, also referred to as a communications interface specification (not shown) and is employed to assist with the communication of information, including data that is acquired (collected), stored and processed by each network element of the system 100.

A communications interface specification is a tangible, such as a written, printed or digitally encoded description of a communications interface. A communications interface is also referred to herein as a communications protocol interface (CPI) and a communications interface specification is also referred to as a communications protocol interface (CPI) specification.

The lower three protocol layers 210A-210C, identified as 802.11 (210A), internet protocol (IP) 210B and transport connection protocol (TCP) 210C are exemplary, and are standard and well known communications protocols that collectively constitute a lower portion of the protocol stack 210, also referred to as a lower protocol stack 210A-210C. The lower three protocol layers 210A-210C, are employed to support and carry the (3) upper protocol layers, respectively the Interchange 210D, Rendezvous 210E and MOMP 210F protocol layers, and are designed in accordance with the invention.

Use of this specific lower protocol stack 210A-210C is not required, and can be modified in various ways to practice the invention. Other communications protocols, or combinations of communications protocols, can be substituted for and/or combined with the protocols 210A-210C in various ways to support and carry the upper protocol layers 210D-210F.

The Interchange protocol layer 210D, also referred to herein as the Exchange layer or Interchange layer 210D, resides on the session layer of the Open Systems Interconnection (OSI) reference model and is employed to carry the Rendezvous protocol 210E or the MOMP 210F protocol.

The application software 220 of the host computer 110C is configured to implement the upper protocol stack 210D-210F while the operating system software 222 of the host computer 110C is configured to implement the lower protocol stack 210A-210C. Likewise the application software 230 of the VSMD 140n is configured to implement the upper protocol stack 210D-210F while the operating system software 232 of the VSDN 140n is configured to implement the lower protocol stack 210A-210C. Likewise, other network elements typically implement the protocol stack in the same manner as described above.

FIG. 2B is a block diagram that illustrates transmitting information from a first network element to a second network element through the communications interface 210. When employing the communications interface 210 to transmit information to a second network element (not shown), the application layer 210G initiates a transfer of information 212g, typically in the form of function call parameters, to either the Rendezvous 210E or the MOMP 210F protocol layers.

In some embodiment, the function call parameters include a pointer to a buffer of information to be transmitted via the communications interface 210. The next receiving protocol layer, either the Rendezvous 210E or the MOMP 210F protocol layer, according to the circumstance, further transfers the information 212e or 212f, to the Interchange layer 210D.

As shown, the information 212e or 212f is input into the Interchange layer 210D from either from the Rendezvous 210E or the MOMP 210F protocol layers, respectively. The information that is input from the Rendezvous 210E layer 212e is typically involved with an establishment or termination of a connection with the second network element. The information that is input from the MOMP 210E layer 212e is typically involved with the use of a connection with the second network element that was previously established by the Rendezvous 210E layer.

The interchange layer 210D inputs the information 212e or 212f and outputs information 212d to the lower protocol stack 210A-210C. The information transfer 212d is structured as an Interchange envelope that surrounds and includes either the information 212e or 212f, depending upon the source of the information 212e or 212f that is input into and processed by the Interchange layer 210D. Specifically, information transfer 212d includes the information 212e in the circumstance where the information 212e is received and processed by the interchange layer 210D, or includes the information 212f in the circumstance where the information 212f is received and processed by the interchange layer 210D.

The lower protocol stack 210A-210C inputs the information 212d and outputs information 212a for communication via a communications channel (not shown) to the second network element. The information 212a includes the information 212d plus protocol information added by the software implementing the lower protocol layers 210A-210C.

FIG. 2C is a block diagram that illustrates receiving information by the first network element from the second network element through the communications interface 210. When employing the communications interface 210 to receive information, the lower protocol stack 210A-210C inputs information 214a transmitted from the second network element via the communication channel and related hardware (not shown). The lower protocol stack 210A-210C processes the information 214a and outputs information 214d to the interchange layer 210D.

The interchange layer 210D inputs and processed the information 214d and outputs (routes) information 214e to the Rendezvous layer 210E or information 214f to the MOMP layer 210F, depending upon to which layer the information 214d is addressed to. The information transfer 214d is structured as an Interchange envelope that surrounds and includes information addressed to either Rendezvous layer 210E or the MOMP layer 210F layer. The interchange layer 210D removes information constituting its envelope.

The Rendezvous 210E and the MOMP 210F protocol layers each input and process and information received from the interchange protocol layer 210D. Each of the protocol layers 210E and the MOMP 210F, output (route) information to the application layer 210G, where applicable.

Figure 2D:
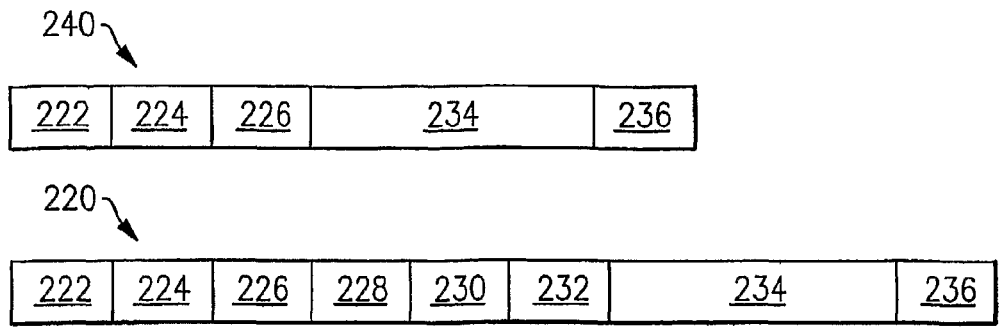
FIG. 2D is a block diagram illustrating a structure of the information that is output from the interchange layer when transmitting from the communications interface.

FIG. 2D is a block diagram illustrating a structure 220 of the information 212d that is output from the interchange layer 210D when transmitting from the communications interface 210. As shown, this structure 220 is also referred to herein as a large version of an Interchange envelope 220, session envelope 220, or a session wrapper 220. The structure 220 is divided into a plurality of portions, referred to herein as fields. The fields include a session preamble field 222, packet length field 224, a port/application identifier field 226, sequence number 228, a UUID field 230, a data length field 232 a data buffer field 234 and a header cyclic redundancy check (CRC) field 236.

The session preamble field 222 is configured to delimit the structure 220 and includes a unique sequence of binary values. The packet length field 224 indicates the length of the entire structure 220 in units of bytes. The port/application identifier field identifies a port number that is associated with an application type. The application type can identify a Rendezvous or WACP application type.

The sequence number field 228 stores a unique identifier for each portion of the structure when the structure is divided into portions in response to limited buffer capacity employed while communicating the structure 220. The UUID field 230 stores an identifier for the structure 220 so that another response communication received by the Interchange layer 210D can be associated with the structure 220. The data length field 232 stores a length of the data buffer field 234, preferably in units of bytes. The data buffer field 234 stores data included within (carried by) the structure 220. The CRC field 236 stores a cyclic redundancy check (CRC) value computed for the entire structure 220.

The structure 240 illustrates a small version 240 of the interchange envelope. The structure 240 includes a subset of the fields of the large version 220. Like the large version, the fields include a session preamble field 222, packet length field 224, a port/application identifier field 226, a data buffer field 234 and a header cyclic redundancy check (CRC) field 236. Unlike the large version 220, the small version excludes the sequence number 228, a UUID field 230, and a data length field 232.

The small version 240 of the interchange envelope can be employed by the interchange layer 210D for information that is small enough to fit within the capacity of buffers employed across the connection while communicating the structure 240. In these circumstances, the interchange envelope 240 is not required to be divided (decimated) and sequenced into smaller portions that fit within one or more buffers of limited size residing between end points of the connection.

Figure 2E:
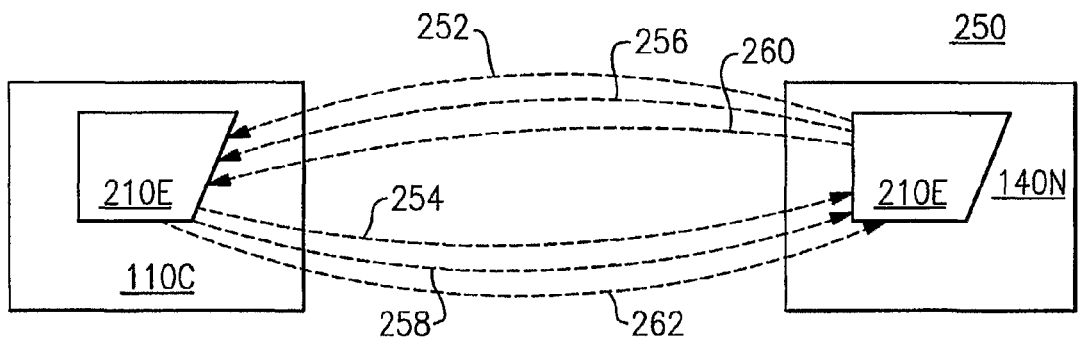
FIG. 2E is a block diagram illustrating an exchange of rendezvous protocol communications to establish a connection between a VSM device and a host network element.

FIG. 2E is a block diagram illustrating an exchange of Rendezvous communications protocol to establish a connection between a VSM device 140n and a host 110c network element. To establish a connection, the rendezvous protocol layer initiates a transmission of a connection request communication 252 that is addressed to the host 110c. The connection request 252 is included within an Interchange envelope 220, 240 and transmitted from the VSM device 140n to the host 110c via the interchange protocol layer 210D and the lower protocol stack 210A-210C operating within the VSM device 140n. The data buffer field 234 of the interchange envelope 220 includes (carries) a "RNDZConnect" string to identify it as a rendezvous protocol connection request message.

Software that implements the rendezvous protocol layer 210E operating within the host 110c receives the connection request communication 252 via the lower protocol stack 210A-210C and the Interchange protocol layer 210D that are operating within the host 110c. The port/application identifier field 226 indicates the rendezvous protocol layer as the application type addressed by the connection request communication 252. The host computer 110c is addressed via the protocols of the lower protocol stack 210A-210C.

Next, the host 110c transmits a connection accept communication 254 to the VSM device 140n. The connection accept 254 is included within an interchange envelope 220, 240 and transmitted from the host 110c to the VSM device 140n via the Interchange protocol layer 210D and the lower protocol stack 210A-210C implemented by software that is operating within the host 110c.

Software operating within the host 110c and implementing the rendezvous protocol layer 210E, receives the connection accept communication 254 via the lower protocol stack 210A-210C and the Interchange protocol layer 210D that are operating within the VSM device 140n. The port/application identifier field 226 of the communication 254 indicates the rendezvous protocol layer as the application type addressed by the connection request communication 252.

A rendezvous connection is now established. Next, the VSM device 140n transmits an encryption key request communication 256 to the host 110c. The host 110c responds by transmitting an encryption key communication 258 that includes an encryption key, also referred to as a session key.

Upon receiving the encryption key, the client transmits a start WACP process request communication 260 to the host 10c. The host 110c responds by executing an instance of a WACP process (not shown) and by transmitting a host ready communication 262. The VSM device 140n receives the host ready communication and transfers control to a WACP process operating within the VSM device 140n (not shown).

The Rendezvous connection terminates when a rendezvous connection termination communication is transmitted by the host 110c. The exchange of communications between the VSM device 140n and the host 110c are independent of the type of communications channel (not shown) that is employed for communication between the VSM device 140n and the host 110c.

Figure 3A:
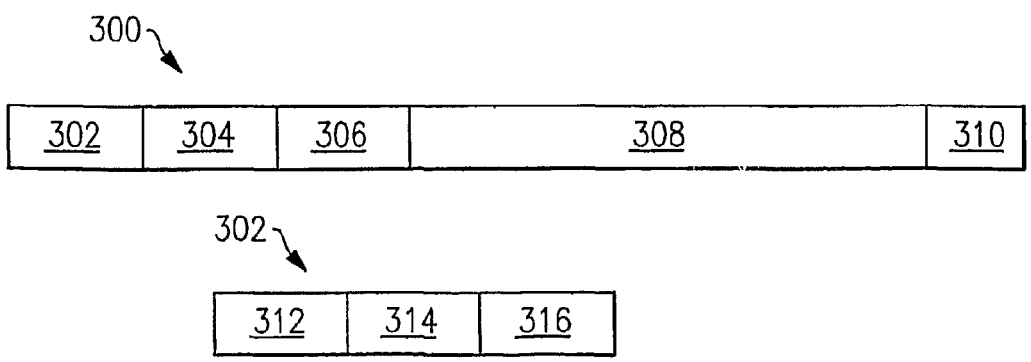
FIG. 3A is a block diagram illustrating a structure of the information that constitutes a medical object management protocol (MOMP) message.

FIG. 3A is a block diagram illustrating a structure of the information that constitutes a medical object management protocol (MOMP) message 300. The MOMP message 300 resides within and is carried by the data buffer field 234 of the interchange protocol message 220, 240. The structure of the MOMP message 300 is divided into a plurality of portions, referred to as fields. The fields include a message identifier field 302, a message size field 304, a message encryption field 306, an object buffer field 308 and a cyclic redundancy check (CRC) field 310.

The message identifier field 302 includes a set of values that identify and classify the type of the MOMP message 300. The message length field 304 indicates the length of the entire MOMP message 300, preferably in units of bytes. The message encryption field 306 includes values that indicate whether any encryption of the MOMP message 300 is being employed and if true, what type of encryption is being employed. The object buffer field 308 stores data that represents a serialized object. The serialized object can be a set of physiological data acquired by a particular network element. The CRC field 310 stores a cyclic redundancy check (CRC) value computed for the entire structure 300.

The message identifier field 302 includes (3) sub-fields that each represent one type classification for the MOMP message 300. Each type classification represents one tier of a (3) tier classification scheme. The first sub-field 312 stores a value representing a first (highest tier) classification, also referred to as a family classification.

In some embodiments, the first classification can identify a particular module having and associated set of physiological data and message types. The data can be physiological data types associated with blood pressure, for example. In one embodiment, the first classification identifies a module having an identifier equal to the text string "FAMILY_NIBP". The module acquires and communicates a set of blood pressure related physiological data types. The identifier "FAMILY_NIBP" is mapped to a unique value that is stored as the first classification, into the first sub-field, for the MOMP message 300 that is associated with the FAMILY_NIBP module. Other text string identifiers are used to identify modules other than the FAMILY_NIBP module.

The second sub-field 314 stores a value representing a second (middle tier) classification, also referred to as a genus classification. The second classification can identify a set of one or more attributes of the FAMILY_NIBP module that is identified by the first classification. In some embodiments, the attributes include types of MOMP messages that are transmitted and/or received by the FAMILY_NIBP module.

In one embodiment, the second classification identifies a request type of MOMP message that is indicated by a text string identifier "Gn_Request". The "GnRequest' identifier is mapped to a unique value that is stored into the second sub-field and indicates that the MOMP message is a request type of MOMP message 300 (See FIG. 3B).

A request type of MOMP message is also referred to herein as being a generic type of MOMP message. A generic type of MOMP message generally characterizes processing associated with an MOMP message but does not provide sufficient information for software to specifically process each byte of the MOMP message. Generally, all three classifications are required to provide sufficient information for software to process each byte of the MOMP message 300.

The third sub-field 316 stores a value representing a third classification (lowest tier), also referred to as a species classification. The third classification can identify a set of one or more additional attributes of the module identified by the first classification and of the MOMP message type identified by the second classification.

In one embodiment, the third classification identifies a particular get blood pressure type of request MOMP message that is indicated by a text string identifier "GET_BP". The "GET_BP" identifier is mapped to a unique value that is stored into the third sub-field and indicates that the MOMP message is a particular "GET_BP" type of request type of MOMP message 300. The particular "GET_BP" type of a request type of MOMP message has a pre-defined byte sequence that provides sufficient information for software to specifically process each byte of the MOMP message 300. A GET_BP type of MOMP message is also referred to herein as being a specific type of MOMP message.

All of the above (3) identifiers, FAMILY_NIBP, Gn_Request, GET_BP are defined within a set of directives, referred to as a device data sheet (See FIG. 6A). A device data sheet (DDS) is employed as input to a software generator (See FIG. 5A) that outputs source code that directs the execution of a directive dependent portion of a communications interface 210, implemented with software that executes on a network element.

The device data sheet (DDS) defines a module that includes defined data and operations associated with the defined data to be processed by a particular device. Typically, the operations associated with the data are expressed in the form of generic and specific MOMP messages that are configured to perform operations upon the defined data. The DDS is used to configure at least a portion of the software that implements a WACP communications interface.

For example, a GET_BP message requests the transmission of blood pressure data from the network element receiving the GET_BP message, to the network element transmitting the GET_BP message. The requested blood pressure data can be transmitted by the network element receiving the GET_BP message via transmission of a PUT_BP message to the network element transmitting the GET_BP message.

Figure 3B:
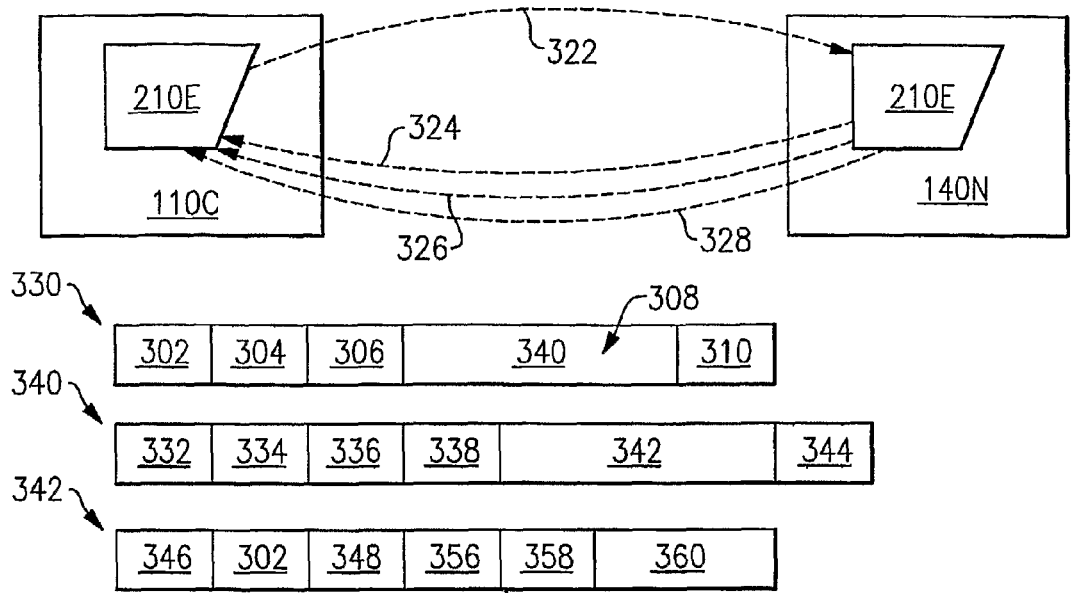
FIG. 3B is a block diagram illustrating an MOMP message exchange between a host device and a VSM device including a request type of MOMP message.

FIG. 3B is a block diagram illustrating an MOMP message exchange between a host device and a VSM device including a request type of MOMP message. As shown, the host device 110c transmits an MOMP request communication 322 to receive blood pressure measurement information from the VSM device 140n. The request communication 322 includes an MOMP message with a message identifier field including the sub-field values represented by the symbols FAMILY_NIBP, Gn_Request and GET_BP respectively.

The first classification identifier FAMILY_NIBP, identifies a module that includes a set of measured blood pressure related data. The second value Gn_Request identifies a request type of MOMP message 300 that is defined in association with the FAMILY_NIBP object. The third value GET_BP identifies a specific structure and representation of data that is requested by the host 110c via the Gn_Request type of message. The host 110c is requesting that the VSM device 140n transmit a response type of MOMP communication, including an instance of the specific structure and representation of data, to the host 110c in response to the request communication 322.

In response to receiving the request communication 322, the VSM device 140n transmits an MOMP response communication 324 including the instance of the specific structure and representation of data associated with the GET_BP specific (species) classification. The response communication 324 includes an MOMP message where the message identifier field includes classifications (sub-field values) represented by the symbols FAMILY_NIBP, Gn_Response and PUT_BP respectively.

The first value (FAMILY_NIBP) identifies the module that includes the requested set of measured blood pressure related data. The second value (Gn_Response) identifies a response type of MOMP message that is defined in association with the FAMILY_NIBP module. The third value (PUT_BP) identifies a specific structure and representation of data that is being transmitted by the VSM device 140n via this (Gn_Response) type of MOMP message 300.

In some circumstances, the VSM device 140n is unable to transmit a response type of MOMP message communication 324 in order to respond to receiving the request type of MOMP communication 322. In this circumstance, the VSM device 140n instead transmits a trap type of MOMP communication 326 in response to the request type of MOMP communication 322. The trap communication 326 includes a trap type 330 of MOMP message 300.

The trap type of MOMP message 330 is structured like a generic MOMP message 300 that includes an error object. Like other generic MOMP messages 300, the trap type of MOMP message has a message identifier field 302 including the first, second and third classifications (sub-field values) represented by the text string identifiers "FmTRAP", "GnError" and "SpError" respectively.

The first identifier (FmTRAP) indicates the module within the VSM device 140n that is responding to the original communication 322 transmitted from the host computer 110C. The original communication 322 was addressed to the (FmNIBP) module of the VSM device 140n, but the (FmNIBP) module was unable to perform actions associated with the original communication 322 and as a result, transferred control to the FmTRAP module of the VSM device 140n in order to respond to the communication 322.

The second classification identifier (GnError) identifies an error type of message that is defined in association with the (FmTRAP) module. The third classification identifier (SpError) identifies a type of error has occurred. This type of error is referred to herein as a "NAK", meaning a non-acknowledgement type of trap MOMP message. In other circumstances, a third value (SpNone) can identify an 'ACK", meaning an acknowledgement type of trap MOMP message.

The trap message 330 includes an error object 340 that is also referred to herein as a trap object 340. The error object 340 resides within the object buffer field 308 of the MOMP message 300 and includes error identification data. The error identification data describes one or more errors resulting from actions or attempted actions of the VSM device 140n in response to receiving the original communication 322.

The structure of the error object 340 is divided into a plurality of fields. The fields include an object identifier field 332, also referred to as a CLSID field 332, an object size field 334, an object version field 336, a bit field 338, an object payload field 342, and an object CRC field 344.

The object payload field 342 is further divided into a plurality of fields. The fields include a message size field 346, a message identifier field 302, an error opcode field 348, a textual error description field 356, an extended error size field 358 and an extended error information field 360.

Preferably, the message size field 346 is expressed in units of bytes. The message identifier field 302 identifies the MOMP message 300 included within the original communication 322 that the error object is responding to. Hence, the message identifier field 302 includes the identifiers (FAMILY_NIBP, Gn_Request and GET_BP) that are stored into the request type of MOMP message 300 included within the original communication 322.

The error opcode field 348 stores a generic error code that is provided by the module that the original communication 322 was transmitted to. Hence, the error opcode field 348 is provided by the FAMILY_NIBP module. The textual error description field 356 is text that is also supplied by the module that the original communication 322 was transmitted to. Hence, the textual error description field 356 is provided by the FAMILY_NIBP module. The host computer 110c is not required to maintain an exhaustive list of error definitions associated with network elements that it may later communicate with.

The extended error information field 360 is provided by the VSM device 140n itself and is device specific, as opposed to being generic information originating from the FAMILY_NIBP module directives and/or the WACP communications protocol interface (CPI) software, also referred to as WACP communications interface software. The extended error size field 358 indicates the size of the extended error information field 360, preferably in units of bytes.

Figure 3C:
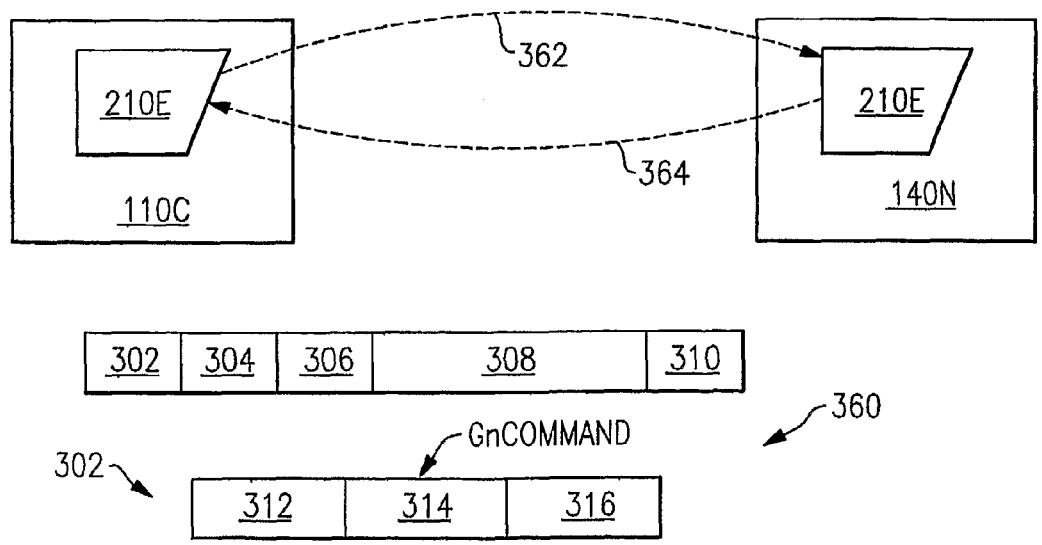
FIG. 3C is a block diagram illustrating an MOMP message exchange between a host device and a VSM device including a command type of MOMP message.

FIG. 3C is a block diagram illustrating an MOMP message exchange between a host device 110c and a VSM device 140n including a command type of MOMP message 300. As shown, the host device 110c transmits a communication 362 including a command type of MOMP message, also referred to as a command communication 362 or a command message 362, to the VSM device 140n.

A command type of communication 362 directs that a specific action be performed by the network element receiving the command communication 362. The command communication 362 includes a command type of MOMP message 300 having a message identifier field including the sub-field values represented by the text string identifiers (FmNIBP), (GnCommand) and (START_NIBP) respectively.

The first classification identifier value FmNIBP identifies a module that includes a set of measured blood pressure related data. The second classification identifier value GnCommand identifies a generic GnCommand type of MOMP message that is defined in association with the FmNIBP module. The GnCommand is a command type of MOMP message. The third value START_NIBP identifies a specific command type of MOMP message that is defined within the GnCommand second classification of the FmNIBP module.

The START_NIBP command 362 is transmitted by the host 10c to the VSM device 140n as a GnCommand type of MOMP message associated with the FmNIBP module. The host 110c is directing that the VSM device 140n initiate a start of a blood pressure measurement cycle via the START_NIBP sub-field.

In response to the command communication 362, the VSM device 140n transmits an MOMP trap type of communication 364 including a trap type of MOMP message having a message identifier field including the classifications (sub-field values) represented by the text string identifiers "FmTRAP", "GnError" and "SpNone" respectively. In this circumstance, the third classification identifier value SpNone identifies an 'ACK", meaning an acknowledgement type of trap message. The acknowledgement indicates a successful completion of the performance of the START_NIBP command, namely the successful initiation of a start of a blood pressure measurement cycle by the receiving network element.

In other circumstances where the command is not performed, the third value equals SpError to indicate an 'NAK", meaning a non-acknowledgement type of trap message. The non-acknowledgement indicates a non-successful completion of the performance of the command, namely the non-performance of the initiation of a start of a blood pressure measurement cycle by the receiving network element.

Figure 3D:
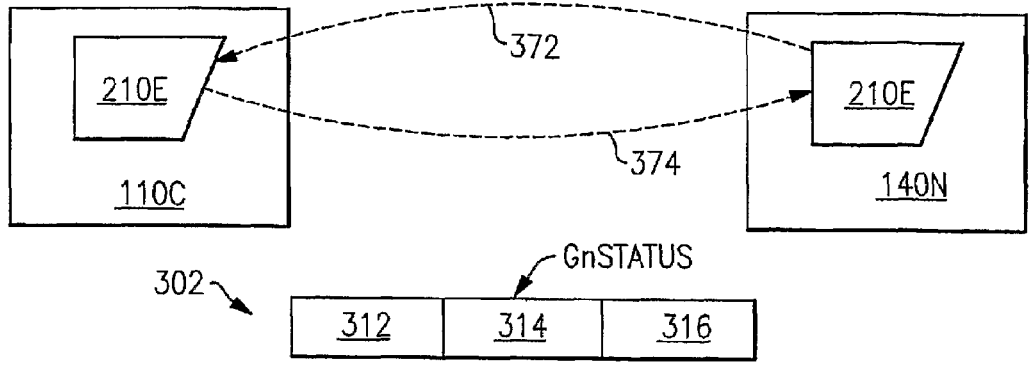
FIG. 3D is a block diagram illustrating an MOMP message exchange between a host device and a VSM device including a status type of MOMP message.

FIG. 3D is a block diagram illustrating an MOMP message exchange between a host device 110c and a VSM device 140n including a status type of MOMP message. As shown, the VSM device 140n transmits a communication 372 including a status type of MOMP message 372, also referred to as a status communication 372 or status message 382, to the host device 110c. A status type of communication 372 provides information to a network element (host) 110c receiving the communication 372.

The status communication 372 includes a static type of MOMP message 300 having a message identifier field including the sub-field values represented by a first classification text string identifier, such as "FmNIBP" for example, a second classification text string identifier "GnStatus" and a third classification identifier, such as "REPORT_BP" for example.

The status communication 372 includes a status type of MOMP message 300 having a message identifier field 302 including the sub-field values representing the first, second and third classification identifiers as (FmNIBP), (GnStatus) and (REPORT_BP) respectively. The "FmNIBP" identifier indicates the module that is transmitting the status communication 372. The second classification identifier equal to GnStatus, indicates that the message is a status type of MOMP message.

The first classification identifier FmNIBP also indicates a module that includes a set of measured blood pressure related data. The second classification identifier GnStatus identifies a GnStatus type of MOMP message that is defined in association with the FmNIBP module. The GnStatus is a status type of MOMP message. The third value REPORT_BP identifies a specific type of status information that is included within the GnStatus classification.

Typically, a status message 372 is transmitted periodically, over time. For example, a WACP communications software module can be configured to transmit a status message 372 to a particular destination every 10 minutes. The host computer 110C responds by transmitting a trap communication 374 that indicates an acknowledgment or a non-acknowledgment of the status communication 372 (See FIG. 3B).

Not all modules are defined including associated status types of MOMP messages. As a result, a status type of MOMP message may or may not be associated with a particular module. There can be many different defined types of status messages as indicated by a specific (species) identifier.

Figure 3E:
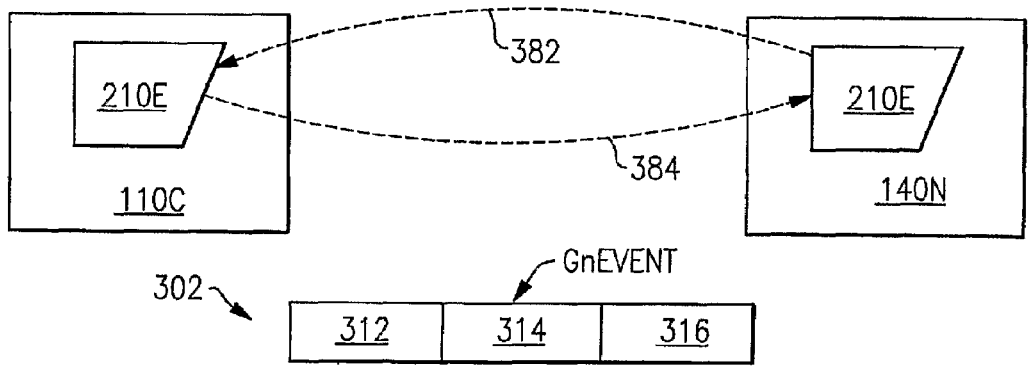
FIG. 3E is a block diagram illustrating an MOMP message exchange between a host device and a VSM device including an event type of MOMP message.

FIG. 3E is a block diagram illustrating an MOMP message exchange between a host device 110c and a VSM device 140n including an event type of MOMP message. As shown, the VSM device 140n transmits a communication 382 including a event type of MOMP message 382, also referred to as a event communication 382 or event message 382, to the host device 110c.

An event type of communication 382 provides information to a network element (host) 110C receiving the communication 382. The event communication 382 includes a event type of MOMP message having a message identifier field including the sub-field values represented by a first classification text string identifier such as "FmPrinter" for example, a second classification text string identifier "GnEvent" and a third classification text string identifier, such as "HW_MOD_CONNECT", for example.

The first classification identifier FmPrinter identifies a particular module that interfaces with a printer. The second classification identifier GnEvent identifies a GnEvent type of MOMP message classification that is defined in association with the FmPrinter module. The GnEvent is an event type of MOMP message. The third classification identifier value HW_MOD_CONNECT identifies a specific type of event information that is included within the GnEvent classification. For example, the HW_MOD_CONNECT event identifies the occurrence of a hardware module being connected with a printer device associated with the FmPrinter module.

Not all modules are defined including associated event types of MOMP messages. As a result, an event type of MOMP message may or may not be associated with a particular module. There can be many different defined types of event messages as indicated by a specific (species) MOMP message identifier.

Typically, an event message 382 is transmitted in response to an occurrence of an event. For example, a WACP communications software module can be configured to transmit an event message 382 upon the occurrence of an event, such as an event represented by the HW_MOD_CONNECT symbol, where hardware is being connected with a printer device associated with the FmPrinter module. The host computer 110C responds by transmitting a trap communication 384 that indicates an acknowledgment or a non-acknowledgment of the status communication 372 (See FIG. 3B).

Figure 3F:
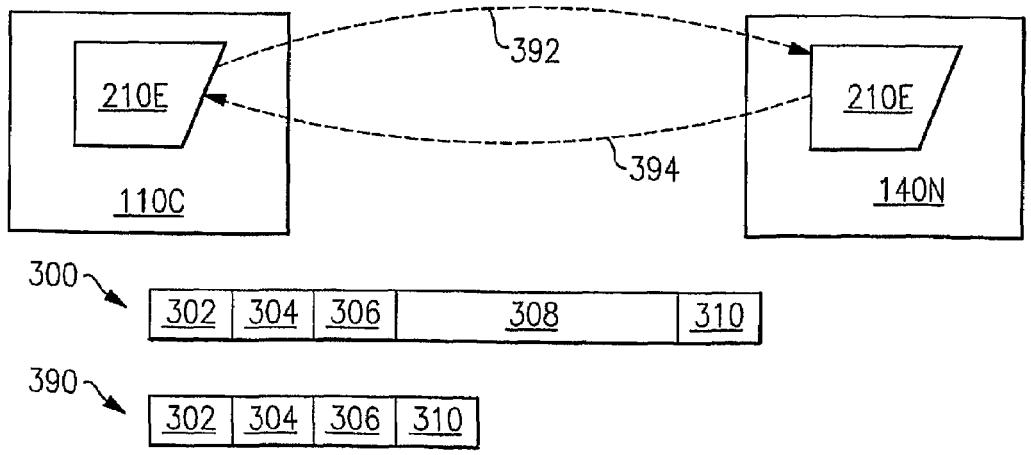
FIG. 3F is a block diagram illustrating a keep alive communications transmitted between network elements.

FIG. 3F is a block diagram illustrating a keep alive communications 392, 394 transmitted between network elements 110c, 140n. A keep alive communication 392, 394 indicates to the receiving network element that the sending network element 110c, 140n is active (alive) with respect to communicating over a particular connection between the network elements 110c, 140n. If a receiving network element that expects to receive a keep alive communication, does not receive a keep alive communication over a pre-determined period of time, then an inference can be made that the sending network element 110c, 140n is no longer available to communicate.

A keep alive communication 392, 304 includes a keep alive type of MOMP message 390 that is also referred to a keep alive message 390. Like a regular MOMP message 300, the keep alive message 390 includes an identifier field 302, a message size field 304, a message encryption field 306 and a cyclic redundancy check (CRC) field 310. Unlike an ordinary MOMP message 300, the keep alive message 390 excludes an object buffer field 308.

The keep alive message 390 has a message identifier field 302 including the sub-field values represented by a first classification text string identifier "FmCONNECTION", a second classification text string identifier equal to either "GnREQUEST", "GnRESPONSE", "GnCOMMAND", "GnCONFIG" and a third classification text string identifier equal to either "SpKEEPALIVE", "SpSHUTDOWN", "SpKEEPALIVEON" or "SpKEEPALIVEOFF".

The first classification identifier FmCONNECTION identifies a particular module associated with a connection between network elements. The second classification identifier identifies an associated MOMP type of message. The third classification identifier value indicates the particular function of the keep alive message 390.

If the third classification equals "SpKEEPALIVE", it indicates to the receiving network element 140n, 110c that the sending network element 110c, 140n is active (alive) with respect to communicating over a particular connection between the network elements 110c, 140n. If the third classification identifier equals "SpSHUTDOWN", it indicates to the receiving network element 140n, 110c that the sending network element 110c, 140n is initiating a shutdown of the connection between the network elements 110c, 140n.

If the third classification equals "SpKEEPALIVEON", it indicates to the receiving network element 140n, 110c that the sending network element 110c, 140n is requesting that the receiving network element periodically transmit keep alive messages 390. If the third classification equals "SpKEEPALIVEOFF", it indicates to the receiving network element 140n, 110c that the sending network element 110c, 140n is requesting that the receiving network element does not periodically transmit keep alive messages 390.

Figure 3G:
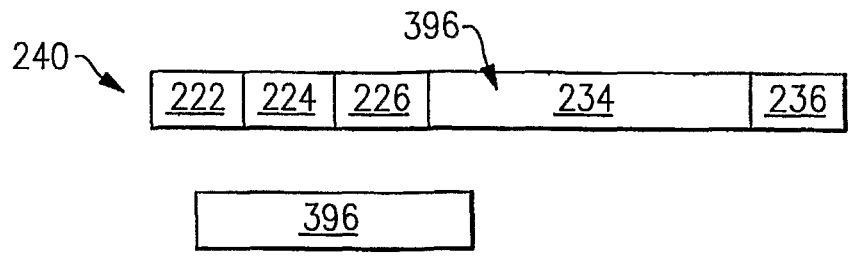
FIG. 3G is a block diagram illustrating a structure of the information that constitutes a data object message.

FIG. 3G is a block diagram illustrating a structure of the information that constitutes a data object message 396. A data object message 396 is carried within the data buffer field 234 of an Interchange envelope 220, 240 in the same manner as an MOMP message 300. The data object message 396 substitutes for an MOMP message 300 within the data buffer field 234. No MOMP message is used to carry the data object message 396.

The structure of the data object 396 is divided into a plurality of fields like that described for an error object 340 (See FIG. 3B). In some embodiments, the data object includes an object identifier field 332, also referred to as a CLSID field 332, an object size field 334, an object version field 336, a bit field 338, an object payload field 342, and an object CRC field 344, like that shown in FIG. 3B. In this format, the data object is referred to as being serialized data object.

Transmitting a data object 396 that is not enclosed within a MOMP message 300 reduces a byte count required per transmission and is more efficient with respect to bytes required to transmit data. In some embodiments, data object messages 396 can be used for streaming of data between network elements.

Figure 4A:
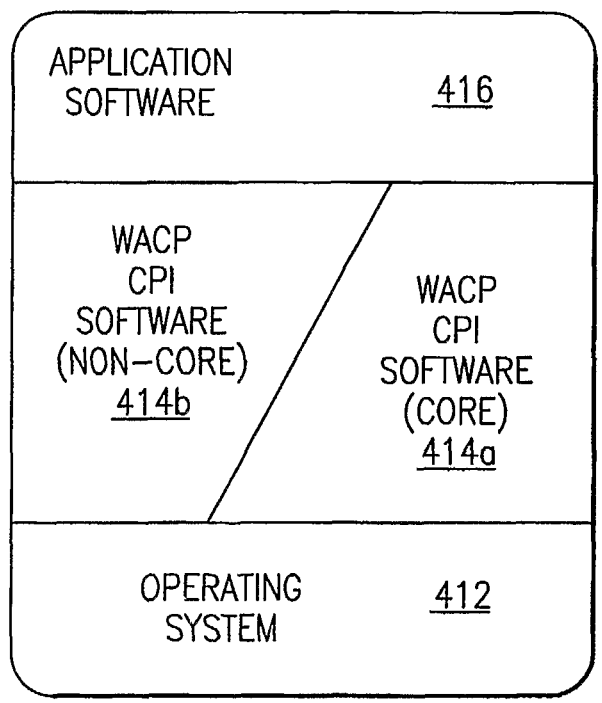
FIG. 4A is a block diagram illustrating an structural arrangement of software in accordance with an embodiment of the invention.

FIG. 4A is a block diagram illustrating a structural arrangement of WACP CPI software in accordance with an embodiment of the invention. The WACP CPI software 414a, 414b is configured to implement the upper protocol stack 210D-210F. The operating system software 412 us configured to implement the lower protocol stack 210A-210C.

The WACP CPI is divided into a core portion and a non-core (extensible) portion. The core portion of the WACP CPI functions as a generic framework that specifies functionality including connection establishment and termination, encryption and generic message types, including the request, response, command, status and error types of MOMP messages. The non-core (extensible) portion of the WACP CPI allows for the addition of modules including associated data and messages. The modules extend the functionality of the core portion of the WACP CPI.

In some embodiments, directives are employed to define modules, to define data included within the module and to define specific structures of request, response, command, status and error types of MOMP messages associated with the defined module. The non-core portion of the WACP CPI enables the functionality of the core portion to be supplemented and customized to accommodate a particular applications.

Accordingly, software that is configured to implement the WACP CPI is divided into a core portion 414a and a non-core (extensible) portion 414b. The core portion 414a of the WACP CPI software is configured to implement WACP CPI functions regardless of what modules are or are not defined within a particular WACP CPI software configuration, and implements functionality including connection establishment and termination, encryption and generic message types, including the request, response, command, status and error types of MOMP messages.

The non-core portion 414b of the WACP CPI software implements the non-core supplemental and customizable functionality in the form of modules. In some embodiments, modules can be added via directives that define module related functionality including operations upon module associated data and messages. The non-core portion of the WACP CPI software supplements the functionality of the core portion of the WACP CPI and of the WACP CPI as a whole.

The core portion of 414a of the WACP CPI software is configured to interface with an operating system 412. Both the core and non-core portions of the WACP CPI software can interface with application software 416.

The non-core (supplemental) features of the WACP CPI software enables customization of the implementation of the WACP CPI itself to accommodate particular communications requirements required by the operation of a particular set of one or more network elements. For example, a portion of the WACP CPI design can be configured to accommodate the communication of particular types and structures of data, such as types of physiological data that are required by a particular set of network elements.

The non-core (supplemental) features of the WACP CPI also enable each implementation (instance) of WACP CPI software to perform a small or large subset, of an entire configuration and version of the WACP CPI. Accordingly, each network element, such as a VSM device 140n, can be configured to implement a small subset of an entire version of the WACP communications protocol interface (CPI), and accordingly, execute a corresponding small subset of the WACP software that is configured to implement the subset of the entire version of the WACP CPI.

Consequently, individual network elements can be uniquely and efficiently configured to communicate a portion, whether a small or large portion, of a vast amount and variety of universally defined device independent data (information) within a network that is configured to acquire, communicate and process such data.

Figure 4B:
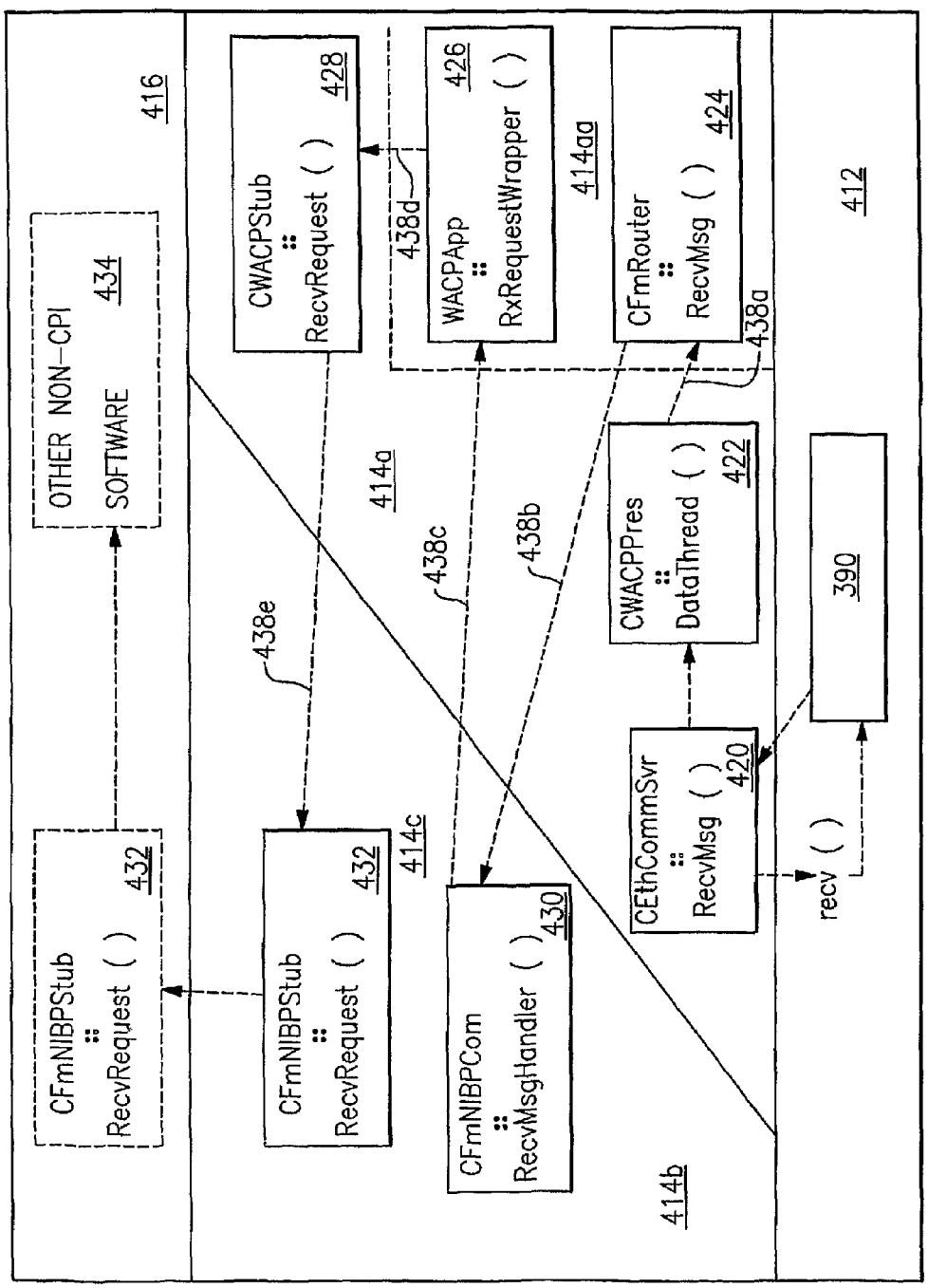
FIG. 4B is a block diagram that illustrates a path of execution through an embodiment of WACP CPI software that receives, processes and routes an incoming request type of WACP message, in accordance with the invention.

FIG. 4B is a block diagram that illustrates a path of execution through an embodiment of WACP CPI software 414 that receives, processes and routes an incoming request type of WACP message, in accordance with the invention. For exemplary purposes, the WACP software is shown as residing within a VSM device 140. The WACP software can also reside in any network element that is configured to employ the WACP communications protocol interface (CPI), including for example, a host computer 110c and/or other types of devices configured to interoperate with WACP enabled network elements.

As shown, the core portion 414a of the WACP CPI software 414 is included within a plurality of software objects 424-426 and the non-core portion 414b-414c of the software 414 is included within a plurality of software objects 422, 428-432. In this embodiment, the software objects are developed from the C++ programming language source code, also referred to as C++ code and/or source code. Each software object encapsulates instructions and data. The instructions of a software object reside within its methods, which are functions residing inside of the software object. In other embodiments, software objects can be developed from other types of source code, such as for example, the source code of the C, C# (C sharp) or Java programming languages.

A WACP message 390 was transmitted to the VSM device 140n from another network element and is received and buffered by the operating system 412. The WACP message 390 is an MOMP request type of message having a first, second and third message classification and that is enclosed within an interchange envelope 220. The WACP CPI software 414 is configured to route, process and deliver the message 390 to an appropriate location within the application software 416 provided that the message 390 passes various integrity checks performed by the WACP CPI software 414.

The processing and delivery of the message 390 will be performed according to various attributes of the message 390, including the first, second and third message classifications stored within the message 390. Upon delivery of the message 390 to a particular location within the application software 416, the application software 416 will decide if and how to respond to the delivery of the message 390.

A path of execution 438 for receiving, processing and routing the WACP message 390 is shown. The path of execution 438 travels through the operating system 412, through the WACP CPI software 414 and into the application software 416. The WACP CPI software 414 is included within a set of software objects 422-432 that collectively receive, process and route the message to the application software 416. Portions of the application software 416 are also included within a set of software objects 432-434.

In this embodiment, the operating system 412 is implemented as a Microsoft Windows 32 bit operating system, such as Windows XP. The operating system 412 and its associated software including its device and network drivers are configured to implement the lower protocol stack 210A-210C of the WACP CPI (See FIG. 2B). The WACP CPI software 414 and its associated software objects 422-236 implement the upper protocol stack 210D-210G.

The upper protocol stack 210D-210G of the WACP CPI software 414 receives communications from the lower protocol stack 210A-210C of the operating system 412 in the following manner. A RecvMsg( ) method of an CEthCommSvr object 420 calls a recv( ) function residing inside of a ws2_32.dll dynamic link library (DLL) to receive and queue a message 390 message buffered inside of the operating system 412. The ws2_32.dll is provided by Microsoft to interoperate with its Windows operating systems including Windows XP, Windows 2000, Windows NT and Windows Server 2003, for example.

The RecvMsg( ) method of the CEthCommSvr object 420 sets a semaphore to indicate the availability of communications data received from the lower protocol stack 210A-210C. The DataThread( ) method of the CWACPPres object 422 executes along a thread, referred to as a message input thread, that waits on the setting of the semaphore by the RecvMsg( ) method of the CEthCommSvr object.

In response to the semaphore being set, the message input thread that is executing the DataThread( ) method of the CWACPPres object 422 unblocks and calls the ProcessMsg( ) method (not shown) of the CWACPPres object 422 which calls 438a the RecvMsg( ) method of the CFmRouter object 424. The method (function) call 438a causes the state of execution of the message input thread to leave CWACPPres object 422 and to enter the CFmRouter object 424 and to travel further along the path of execution 438 to process and route the buffered incoming WACP message 390.

The RecvMsg( ) method extracts the first classification identifier from the message 390 and maps it to an object pointer that is an address of an instance of an CFmNIBPCom object 430 that is associated with the first (family) classification, of the message 390. Next, the RecvMsg( ) method calls 438b a RecvMsgHandler( ) method residing within the instance of the CFmNIBPCom object 430.

Next, the RecvMsgHandler( ) method extracts the second (genus) classification identifier from the message 390 and maps it to a pre-registered (pRequestHandler) function pointer (not shown) and calls 438c the (pRequestHandler) function object pointer. The function pointer is an address of an RxRequestWrapper( ) method residing within an instance of a CWACPApp object 426. The RxRequestWrapper( ) method is configured to process a request type of MOMP message.

Hypothetically, if the message 390 was a different type of MOMP message, for example if the message 390 was a response or command type of MOMP message, as indicated by its second/genus classification, the function pointer would store an address of a method, other than that of the RxRequestWrapper( ) method, that would be configured to process the type of message (second classification) and the type of module (first/family classification).

Next, the RxRequestWrapper( ) method of the CWACPApp object 426 verifies that the sender of the message has successfully passed a prior authentication check and if true, calls 438d the RecvRequest( ) method residing within an instance of the CWACPStub object.

Next, the RecvRequest( ) method residing within the instance of the CWACPStub object 428 switches on the value of the first classification identifier (FmNIBP) and calls 438e the RecvRequest( ) method of an instance of an CFmNIBPStub object 432. Note that the text "NIBP" is unique to the name/identifier of an extended module (FmNIBP) the WACP CPI and that is associated with the first classification of the message 390.

The instance of the CWACPStub object 432 is available to optionally store application source code 436 in order to specify actions to be performed by the application software 416 in response to receiving the message 390 via the WACP CPI software 414. Hence, the CWACPStub object 432 is configured to store both WACP CPI software 414 and application software 416.

Reviewing the path of execution 438, the objects CFmRouter 424 and CWACPApp 426 are static core WACP software objects, meaning that the source code defining each of these objects is not configured to be a modifiable portion of the WACP CPI software. Hence, these objects 424-426 do not reside within the non-core portion of the WACP CPI and its software 414.

In the embodiment described, the WACP software objects CWACPPres 422, CWACPApp 426 and CWACPStub 428 are dynamic core objects, meaning that at least some of the source code included within the definition of these objects is configured to be a modifiable portion of the WACP CPI software. Hence, these objects 422, 426, 428 reside within the dynamic (non-static) core portion of the WACP CPI and its software 414. In other embodiments, modifiable source code can be assigned to different sets of objects.

The objects CFmNIBPCom 430 and CFmNIBPStub 432 are non-core WACP software objects, because the very existence of and all source code included within the definition of these objects is (414c) in response to the configuration of an additional non-core (FmNIBP) module to the WACP CPI software 414. Hypothetically, if the FmNIBP module was not of configured to be added to the WACP CPI software 414, the software objects 430-432 and other objects (not shown) would not exist within the WACP CPI software 414.

Core WACP CPI objects are configured to be present within any foreseeable WACP CPI configuration. Extended WACP CPI objects exist in response to extensions to the WACP CPI. Hence, the CWACPPres 422, CFmRouter 424, CWACPApp 426 and CWACPStub 428 objects are core objects and the CFmNIBPCom 430 and CFmNIBPStub 432 objects are non-core (extended) objects within the WACP CPI software 414.

Of the core objects 422-428, the CFmRouter 424 and CWACPApp 426 objects are static and the CWACPPres 422 and the CWACPStub 428 objects are dynamic with respect to the source code included within them. All of the non-core objects, CFmNIBPCom 430 and CFmNIBPStub 432, are dynamic with respect to the source code included within them.

Notice that functions names including a substring "Stub" indicate that the function is s stub function. A stub function is a location within the source code where an application programmer is free to add application specific source code to connect the CPI software 414 with application software 416. In some embodiments, there can be assigned a stub function for each message type defined for each module type. In some embodiments, stub functions are also implemented as call back functions. Call back functions are intended to be called from the CPI software in response to a pre-specified event, such as the reception of a message.

Figure 4C:
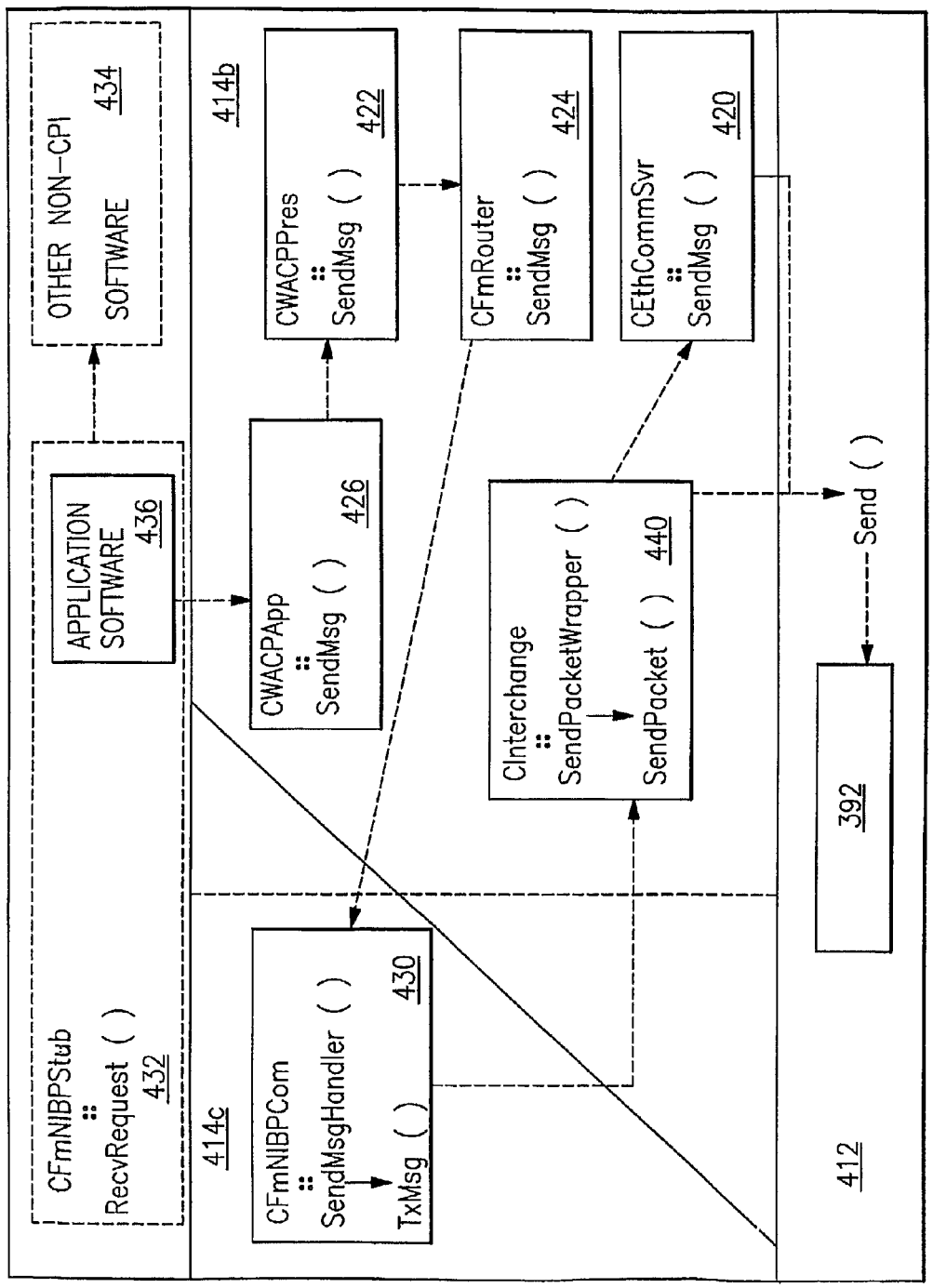
FIG. 4C is a block diagram that illustrates a path of execution through an embodiment of WACP CPI software that transmits a response type of WACP message, in response to receiving the request type of WACP message of FIG. 4A.

FIG. 4C is a block diagram that illustrates a path of execution through an embodiment of WACP CPI software that transmits a response type of WACP message, in response to receiving the request type of WACP message of FIG. 4A. The RecvRequest( ) method of the CFmNIBPStub object 432 includes application software 436 that is configured to perform actions in response to receiving the WACP message 390.

In response to receiving the WACP message 390 of FIG. 4B, the application software 436 residing within the CFmNIBPStub object 432 calls a SEND_RESPONSE( ) function which maps to a SendMsg( ) method residing within a instance of a CWACPApp object 426. The SendMsg( ) method of the CWACPApp object 426 calls the SendMsg( ) method residing within an instance of CWACPPres object 422. The SendMsg( ) method of the CWACPPres object 422 calls the SendMsg( ) method residing within the CFmRouter object 424. The SendMsg( ) method of the CFmRouter object 424 maps the first (family) classification identifier to a function pointer and calls the function pointer. The function pointer stores an address of a SendMsgHandler( ) method residing within an instance of the CFmNIBPCom object 430. The instance of the SendMsgHandler( ) method is configured to process the response type of MOMP message to be transmitted.

Next, the SendMsgHandler( ) method switches off the value of the second (genus) classification identifier and calls a TxMsg( ) method also residing within the same instance of the CFmNIBPCom object 430. The TxMsg( ) calls a function pointer that stores an address of a SendPacketWrapper( ) method residing within a instance of a CInterchange object 440.

Next, the SendPacketWrapper( ) method 440 compares a semaphore name to an application name and then calls a SendPacket( ) method also residing within the CInterchange object 440. The SendPacket( ) method serializes a response type of MOMP message and calls a SendMsg( ) method residing inside of an instance of a CEthCommSvr object 420.

Next, the SendMsg( ) method of the CEthCommSvr object 420 calls a send( ) function residing inside of a ws2_32.dll dynamic link library (DLL) to queue the message for transmission by the lower protocol layers 210A-210C. The ws2_32.dll is provided by Microsoft to interoperate with its Windows operating systems including Windows XP, Windows 2000, Windows NT and Windows Server 2003, for example.

Next, the operating system 412 exercises the lower protocol stack 210A-210C to transmit the message to a destination network element.

The WACP CPI is describable in terms of a WACP CPI specification that includes a core and an extensible portion. The WACP CPI is not entirely fixed and is designed to be flexible and extensible beyond what is described by the core portion of the WACP CPI specification, in order to accommodate extended (particular) functionality that is required to reside within each of various types of network elements. The extended functionality can be employed for communication of various types of data, commands and other information by each of the various types of network elements. The extended functionality can be configured to be limited and customized to particular groups of one or more network elements.

Extended functionality is added to the WACP CPI in the form of one or more (add on) modules. Each module is identified by the first (family) classification identifier and is further characterized by other attributes, including those indicated by the second (genus) classification identifiers and the third (species) classification identifiers that are associated with the first classification name of the module.

Each module is defined from source code that specifies information, including data, procedures and messages that are associated with each respective module. The messages are employed to communicate various types of information between each respective module and other network elements. The procedures are employed to perform operations upon the information and to communicate the information between the module and other network elements.

In some embodiments, the defined data is classified into a configuration category and a data category. The data category includes data that the network element acquires from other sources, such as from a health care patient. The configuration category includes data specifying the configuration of the operation of the particular network element for the purpose of acquiring the data from other sources.

Figure 5A:
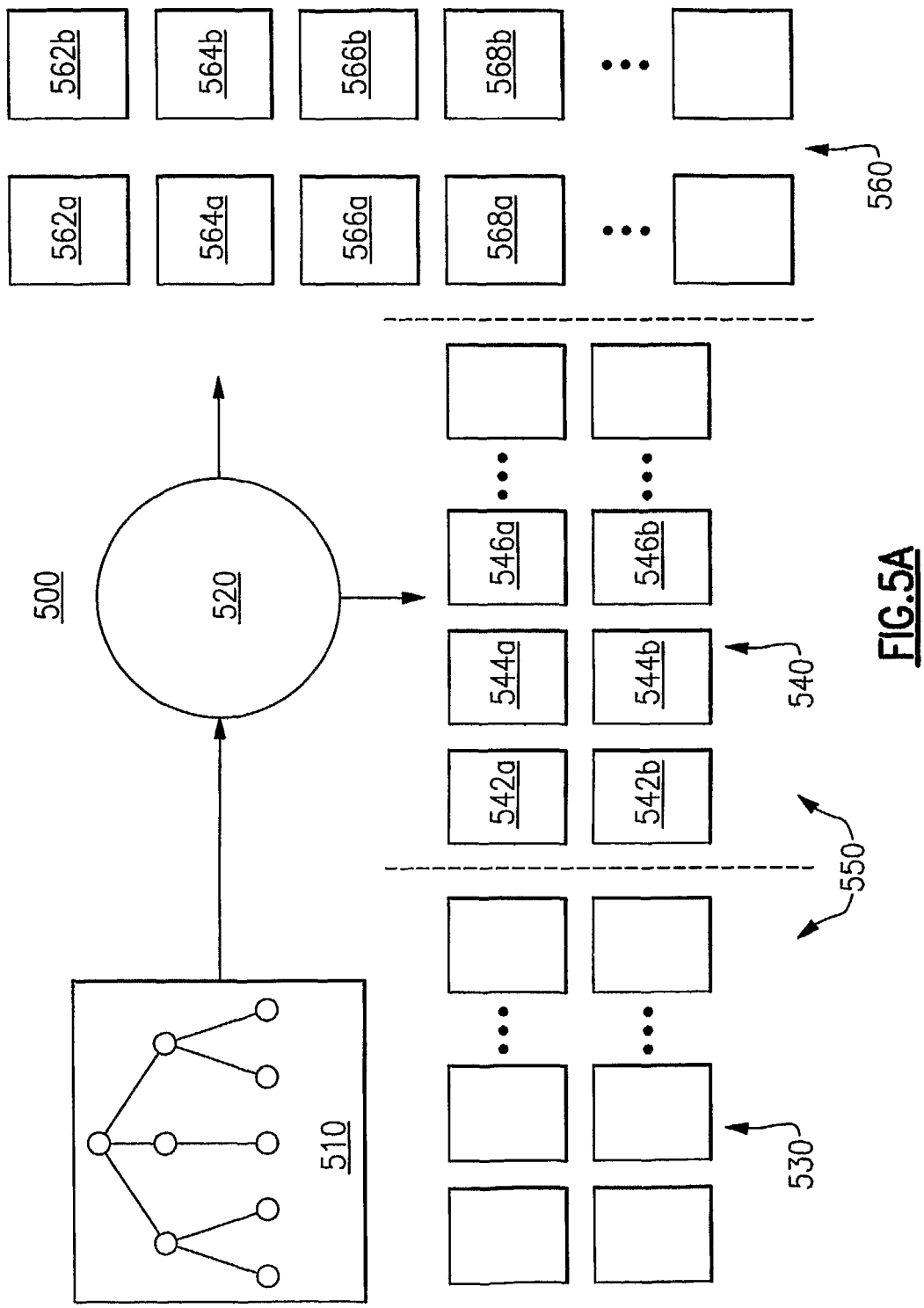
FIG. 5A illustrates a system that includes a software generator that is configured to input a set of directives and to output source code in response to the set of directives.

FIG. 5A illustrates a system 500 that includes a software generator program 520 that is configured to input a set of directives 510 and to output source code 540-560 in response to the set of directives 510. In some embodiments, the software generator program 520 is referred to as application generator 520 or as AppGen 520.

In a typical use scenario, the directives specify the addition of one or more modules of functionality, also referred to as extensible functionality, to the core functionality of the WACP CPI and to the software 414 that implements the WACP CPI, also referred to as a (WACP) communications software module 414. The extensible functionality is described via the directives 510 that represent the extensible portion of the WACP CPI specification. In this example use scenario, the directives 510 specify the addition of one module that is assigned a name of "FmNIBP".

The core functionality of the WACP CPI is implemented as a core set of source code files 550 that include static (unrevised) core source code files 530 and dynamic (revised) core source code files 540. Each module that is added to the core functionality of the WACP CPI is implemented as revisions to a subset 540 of the core set of source code files 550 and is implemented as software stored within a set of newly created source code files 560. The newly created source code files 560 are combined (compiled and linked) with the static source code files 530 of the core set 550 and the revised source code files 540 of the core set 550. The source code files 560 are combined with the core set of source code files via compiling or interpreting the source code files 560 and linking of the compiled or interpreted binary with the compiled or interpreted binary of the core set 550 of source code files using appropriate software development tools.

In one use scenario, the source code files 550, 560 are compiled into linkable object (binary) files and linked with object files constituting a remaining portion of the WACP CPI software 414 as a whole. The linkage (combination) of all of the object files of the WACP CPI software 414a, 414b is also referred to as a communications software module 414.

In this use scenario, a compiler program, such as a C++ compiler and a linker program are employed to produce a communications software module 414 in the form of a library. The library can be a static or a dynamically linked library. The library 414 is linked with the other application software 416 embodied as object files that are compiled from source code. The revised portions of the source code files 540 and the contents of the files 560 embody source code that represents the extensible portion of the communications software module 414b.

In other use scenario, a interpreter program, such as a Microsoft Visual C++ interpreter and debugging program, is are employed to execute a communications software module 414 in the form of an interpreted library. The library 414 is linked by the interpreter program with the other application software 416 interpreted from application source code.

For the example use scenario shown, the directives 510 specify the addition of one module identified by the name "FmNIBP". The substring "Fm" indicates a module (family) identifier, and the substring "NIBP" identifies a textual name of the particular module (family). The source code files 560 are created in response to the software generator program 520 processing (including inputting and parsing) the directives defining the NIBP module. Without the software generator program 520 processing the NIBP module directives, the source code files 560 would not be created by the software generator program 520 and would not exist within the WACP CPI software 414. The source code files 540 are files that would exist within the WACP CPI source code 414 with or without the processing and inclusion of the NIBP module. Portions of the source code files 540 are each revised in some way in response to the processing of the NIBP module directives by the software generator program 520 and the resulting inclusion of the NIBP module software 414b into the WACP CPI software 414.

For this use scenario, the FmNIBP module causes the creation of source code files named CFmNIBPcom.h 562a, CFmNIBPcom.cpp 562b, CFmNIBPStub.h 564a, CFmNIBPStub.cpp 564b, CNIBPCStd.h 566a, CNIBPCStd.cpp 566b, CNIBPDStd.h 568a, and CNIBPDStd.cpp 568b. Notice that the filenames of the aforementioned source code files 562a-568b each include the text "NIBP".

Also, for this use scenario, the FmNIBP module causes revision, including the addition of source code, to the pre-existing source code files named CWACPApp.h 542a, CWACPApp.cpp 542b, CWACPPres.h 544a, CWACPPres.cpp 544b, CWACPStub.h 546a and CWACPStub.h 546b. Other pre-existing source code files 530 of the core set of source code files 550 remain un-revised after processing the FmNIBP directives and adding the FmNIBP module related software 414b to the WACP CPI software 414. Notice that the filenames for the core set of source code files 530 do not include the text 'NIBP".

FIG. 5B is a block diagram illustrating the different configurations of WACP CPI software 414 that are installed onto a plurality of interoperating network elements 110C, 140n, 160. A host computer 110C includes WACP CPI software 414 configured to include modules 580a-580n. A VSM device 140 includes WACP CPI software 414 configured to include two WACP CPI modules 580a, 580c and communicates with the host 110C via a WiFi 802.11 communications channel via WiFi gateway 170. Another device 160 includes WACP CPI software 414 configured to include two WACP CI modules 580b, 580d and communicates with the host 110C via a USB communications channel 148.

Notice that both the VSM device 140n and the other device 160 employ the same core WACP CPI software 414 yet acquire, process and communicate different types and structures physiological data (information) to a common host computer 110C. The host computer is configured to interoperate with both the VSM 140n and the other device 160.

Modules that are common to two or more of the three configurations 470a-470c of the installed WACP CPI software 414 are generated from the same global set of directives (See FIG. 5D). The extensible portion of the communications protocol interface is configured to be customized in scope so that each network element 110C, 140n, 160 can be installed with a customized configuration 470a-470c and communicate a unique and optionally small, subset of actual data that corresponds to at least a portion of a larger defined data set.

A circumstance of a common module, where a module that is common to more than one configuration 470a-470c, constitutes a circumstance of complementary overlap between the more than one configuration. Another circumstance, where a first configuration (built from a first set of one or modules of directives) includes a first module and a second configuration (built from a second set of one or more modules of directives) includes a second module and where the first module is configured to transmit a set of message types, and where said second module is configured to receive said set of message types, is another example of complementary overlap.

FIG. 5D illustrates portions of a global set of directives 680 being built into different configurations. The global set of directives for an entire system of network elements, include directives for modules 60a through 680z. As shown, directives of module 680b and 680d are input into the software generator program 520 and output as software including software modules 580b and 580d. Directives of module 680a and 680c are input into the software generator program 520 and output as software including software modules 580a and 580c. Directives of modules 680a through 680n are input into the software generator program 520 and output as software including software modules 680a through 680n.

The larger defined data set, referred to as the global data set 680 or as a data dictionary 680 of directives, is a super-set of directives that includes directives for all modules that are defined for an entire system that includes all communicating network elements. Typically, the data dictionary conforms to a defined data model supporting an entire system of interoperating network elements.

Portions of the data dictionary 680 are input into the software generator program 520 to generate custom configurations 470a-470 that are configured to interoperate with each other. In some embodiments, the data dictionary 680 includes a physiological data description. Portions of the data dictionary 680 are referred to as a data description sheet or data description file.

In some embodiments, the data of the system is defined and structured as data objects. A data object is an object that encapsulates data that can be processed in particular ways by software of the system. Data objects are implemented as a data only portion of software objects, such as a portion of C++ or Java class objects. Although software objects encapsulate both instructions and data, data objects encapsulate only data.

Software objects are typically represented as classes defined within a class hierarchy. In some embodiments, data objects are represented by data only classes within a class hierarchy. Data objects reside as a portion of software that implements a module and are serialized when transmitted from a first network element and are de-serialized when received by another second network element.

The design of this type of embodiment enables data objects to have attributes of software objects. For example, data objects can be defined within the context of a class hierarchy and inherit attributes of various classes that may also define other objects.

In some embodiments, at least one attribute enables software objects and data objects to be version classified and version identifiable by software components that interoperate with the software and data objects during runtime execution. Configurations built from directives defining data of a later version, can interoperate and process data from configurations built with directives of an earlier version.

In some embodiments, a policy is enforced when entering or revising directives, where new data is defined and located via the directives at a location within a particular module, after previously defined data. Hence, new data is defined and appended (located) after previously defined data within a module and the directives distinguish particular data by a chronology of their definition within the module in order to indicate data having an earlier associated version from data having a later associated version.

As a result, a communication software module can extract data having an earlier associated version, from one or more software object classes (implementing a module) that include data having a later associated version. For example, a first network element executing a first communications software module that implements a module of a later version can recognize and process data that is received from a second network element executing a second communications software module that implements the same module of an earlier version.

This benefit results from the policy of entering and revising directives that ensures that a location of the earlier versioned data within the later versioned module is the same as the location of the earlier versioned data within the versioned module, because the earlier versioned data has the same physical offset within both the earlier and later versioned modules.

To further take advantage of this benefit, a network element operating as a central hub, such as the host computer 110C, is preferably installed with software 414 and data of one or modules of a later or equal version that modules of other more peripheral types of network elements, such as VAM 140n and the other device 160, which are not operating as a central hub. A policy regarding software and data version upgrades of various network elements to take advantage of the aforementioned benefit can ensure continuity of the interoperation (backward version compatibility) between network elements with respect to data objects and the WACP CPI software 414 that process those data objects. Such a policy can maintain interoperability of a plurality of network elements while accommodating evolution of the data over time.

In accordance with an embodiment of the invention, data objects processed by the system are defined and structured using extensible markup language (XML) according to rules which parallel the rules of an object oriented programming language, such as C++. The definition and structure of data objects are stored into one or more data definition files. In some embodiments, the data definition files are based upon classification of physiologic types.

Figure 5C:
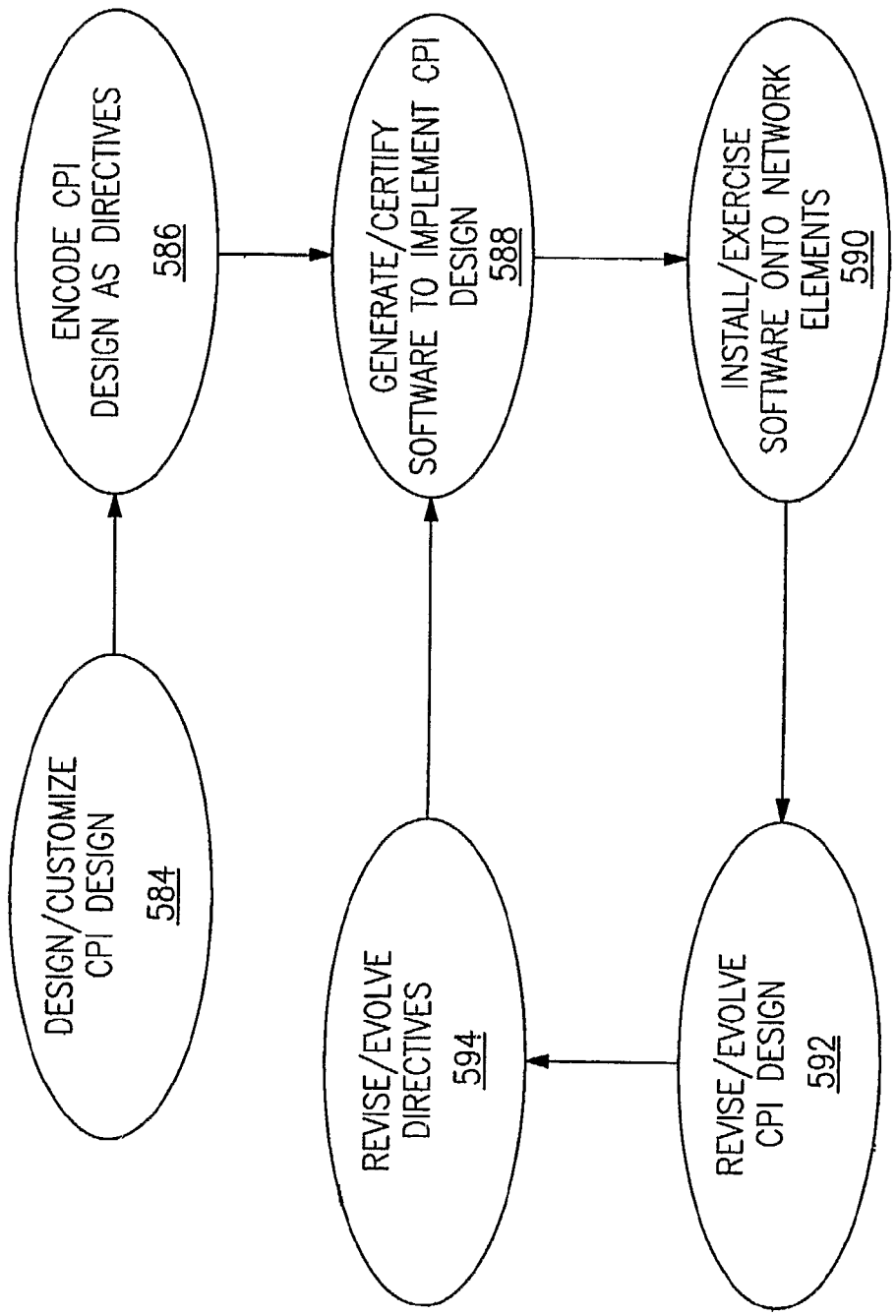
FIG. 5C illustrates a flow chart for designing and evolving, and automatically generating and certifying software that implements a WACP communications protocol interface (CPI).

FIG. 5C illustrates a flow chart for designing and evolving, and automatically generating and certifying software 414 that implements a WACP communications protocol interface (CPI). Computing environments each require communication of particular types and structures of data. The invention enables different network elements (devices) to communicate using a common interoperable communications interface that is implemented in software 414 and that is configured to enable communication the particular types and structures of data.

In some embodiments, the types and structures data can include aspects of human or other physiology. For example, the data can represent systolic and/or diastolic blood pressure, heart rate, electrocardiogram signals (ECG) or SPO2 measurements associated with one or more patients. If separate monitoring devices represent and communicate acquired physiology data differently, the WACP CPI enables each of the different devices to communicate their acquired physiology data in the same structure and format, according to a particular WACP CPI specification and implementation.

In other embodiments, the data can represent information acquired from devices that monitor the status of entities, such as people, places or things that are located within various types of environments. Such things can include equipment within a retail, banking, manufacturing, or a health care environment, for example.

As a first step 586, responsible personnel identify a communications protocol interface (CPI) scheme (design) that best suites a particular application involving a network communication environment. Accordingly, a communications protocol interface (CPI) specification (description) is identified, for example either designed or selected, by the responsible personnel, also referred to herein as personnel. The personnel have the option to design an original or to select a pre-existing communications protocol interface (CPI) specification. Next 586, if the CPI is designed, then the specification (description) of the designed CPI is encoded (represented) as a set of directives defining one or more modules of functionality. Instead, if the CPI is selected, and associated pre-existing directives are available, then pre-existing directives associated with the selected CPI specification are obtained.

Next 588, the software generator program 520 is executed (operated) in order to input the set of extensible directives and to output an extensible portion of software 414b that implements the CPI specification. The extensible portion of the software 414b is generated in compliance with the extensible set of directives that describe the designed or selected CPI specification. A core portion of software 414a that implements a core portion of the CPI specification is combined (linked) with the extensible portion of the software 414b that is generated to produce a complete module of software 414, also referred to as a communications software module 414, that implements the CPI specification.

In some embodiments, the core portion of the software 414a includes platform (operating system) dependent software while the extensible portion 414b includes platform (operating system) independent software.

Next 590, the complete module of software 414, implementing the core and extensible portions of the CPI specification, referred to as a communications software module 414, is installed and exercised on a plurality of network elements 110a-110c, 140a-140n, 160. Each instance of a communications software module 414 that is installed onto a network element 110a-110c, 140 enables that network element to communicate and interoperate with other network elements.

After installation and during operation, particular types and structures of data are serialized by a communications software module transmitting data from a first network element and de-serialized by a communications software module receiving data to a second network element.

Next 592 if data and/or communications requirements for the computing environment, evolve (change) over time, the design of the CPI specification is revised (modified) accordingly to accommodate the evolved (changed) communications requirements. Likewise, the directives that represent the design of the CPI specification are also revised (modified) 594 to accommodate the new communications requirements.

Next 588, the software generator program 520 is re-executed (operated) in order to input the revised set of extensible directives and to output a revised extensible portion of software 414b that implements the revised CPI specification. The extensible portion of the software 414b are re-generated in compliance with the revised extensible set of directives that describe the re-designed or re-selected CPI specification. A core portion of software 414a that implements a core portion of the CPI specification is combined (linked) with the re-generated extensible portion of the software 414b to produce a complete module of software 414 that implements the revised CPI specification.

The step of generating software that implements the extensible portion of the CPI specification is likely to be far more accurate and reliable that creating software manually by line for line entry of source code via programmers. In effect, software 414b that is generated is also certified for compliance with the CPI specification as represented by the extensible directives. Compliance to the CPI specification is enforced by the software generator 520 and core software 414a that is combined (linked) with the generated extensible software 414b.

FIG. 6A illustrates a set of directives 610 that define a plurality of extended modules and that are encoded in Extensible Markup Language (XML). As shown, the directives 610 include an XML declaration (version) statement 612, an XML root element tag named "DDS_DEMO" 614 and other XML element tags that are named "FAMILY_NIBP" 616, 'FAMILY_ERROR" 618, "FAMILY_BATTERY" 618, "FAMILY_DTCOLLECTION" 622 and "FAMILY_WAVE" 624. The XML element tags are also referred to as element tags, XML tags or tags.

Each of the aforementioned element tags are associated with a same named XML element. For example, the FAMILY_NIBP element tag represents a FAMILY_NIBP element and the FAMILY_BATTERY element represents a FAMILY_BATTERY element. The XML elements that are associated with each of the element tags 616-624 are unexpanded (not fully shown) and can include other nested XML elements that are not shown in FIG. 6A. The XML elements are also referred to as elements.

FIG. 6B illustrates the set of directives 610 of FIG. 6A including XML element tags that are nested one level below the <FAMILY_NIBP> element. The <FAMILY_NIBP> element includes information located between the <FAMILY_NIBP> element start tag 616 and the <FAMILY_NIBP> XML element end tag 638. The <FAMILY_NIBP> element is said to be expanded to reveal one level of element tags below it. The element tags that are located one level below the <FAMILY_NIBP> element are referred to as child elements of the <FAMILY_NIBP> element and are named "SPECIES KEY" 630, "CNIBPDSTD_DEFINITION" 632, "CNIBPDSTD_DEFINITION" 634 and "MESSAGES" 636. A <FAMILY_NIBP> element end tag 638 marks the end of the XML defining the FAMILY_NIBP XML element.

The XML defining the FAMILY_NIBP element includes directives, referred to as FAMILY_NIBP module directives, that are located between the <FAMILY_NIBP> element start tag 616 and the element end tag 638 and that define the FAMILY_NIBP module. The FAMILY_NIBP module directives are input into the software generator 520 to generate source code for the FAMILY_NIBP module. The source code is stored within the source code files 542a-546b and 562a-568b of FIG. 5A.

FIG. 6C illustrates XML element tags that are located one level below the <MESSAGES> 636 element of the <FAMILY_NIBP> element of the set of directives 610 of FIG. 6A. As shown, a series of elements tags 642a-642 are each named "MSG" and each represent a <MSG> element that is nested below the <MESSAGES> element 636. Each <MSG> element is defined with type, name and description attribute. For example, the <MSG> element 642 has a type attribute value of "Request", a name attribute value of "GET_BP" and a description attribute of "Get BP".

Each module type (family) has its own unique scope of functionality, and its own unique set of stored data, and a unique set of messages that it transmits and receives. A module itself is identified to the software generator 520 via a first (family) classification identifier, such as supplied by the <FAMILY_NIBP> 616 or <FAMILY_BATTERY> 620 element tags that are located one level below the root tag 614 of the directives 610.

Within (nested below) a family element, the software generator 520 interprets certain directives to be second (genus) classification and third (species) classification identifiers associated with the first (family) classification identifier the module.

In the example embodiment, the software generator 520 interprets certain attributes of each <MSG> element type to be either a second (genus) classification identifier or a third (species) classification identifier. The software generator 520 interprets the "type" attribute value to be a second (genus) classification identifier and interprets <MSG> element "name" attribute value to be a third (species) classification identifier.

As a result, the software generator 520 interprets the messages of the FAMILY_NIBP module to have (8) messages that are each associated with one of (8) third (species) classification identifiers and that are associated with on of (4) second (genus) classification identifiers. For example, the <MSG> element 642 represents a message having a second (genus) classification identifier represented by a "Request" identifier and a third (species) classification identifier represented by a "GET_BP" identifier The second (genus) classification identifier value equal to "Request" indicates that the associated message is a Request type of WACP message (See FIG. 3B). The third (species) classification identifier value equal to "GET_BP" indicates a particular WACP message structure. Hence, the "GET_BP" message structure is a Request type of WACP message.

In response to inputting the <MSG> element 642, the software generator 520 generates source code for the FmNIBP module that processes a "GET_BP" message structure, being a Request type of WACP message, like that described for FIGS. 4A-4C. Likewise, the software generator 520 generates source code for the FmNIBP module that processes a messages described by the other <MSG> elements 644-656.

FIG. 6D illustrates XML element tags that are located one level below the <CNIBPCSTD_DEFINITION> 634 element of the <FAMILY_NIBP> element of the set of directives 610 of FIG. 6A. As shown, elements named "STATIC_MEMBERS" 658 and "ENUMERATIONS" 660 are nested below <CNIBPCSTD_DEFINITION> 634 element. Elements named 'VAR" are nested below the <STATIC_MEMBERS> 658 element. Elements names "ENUM" are nested below the <ENUMERATIONS> 660 element.

The <CNIBPCSTD_DEFINITION> element 634 is defined with a class, abrv, version, family, genus and species attribute. The <CNIBPCSTD_DEFINITION> element 634 has a class attribute value of "CNIBPCStd", an abrv attribute of "CNBPCSTD", a version attribute of "102", a family attribute of "FmNIBP" a genus attribute of "GnCONFIG" and a species attribute of "SpSTANDARD".

In the example embodiment, the software generator 520 interprets the <CNIBPCSTD_DEFINITION> element 634 as representing a C++ software object class having a name of "CNIBPCStd". In response to inputting the <CNIBPCSTD_DEFINITION> element 634, the software generator 520 generates source code for the FmNIBP module that allocates an object class named "CNIBPCStd". The C++ programming language is one of many object oriented programming languages.

The element tags 646a-646b are each named "VAR" and each represent a <VAR> element that is nested below the <STATIC_MEMBERS> element 644. Each <VAR> element is defined with a type, name and comment attribute. For example, the <VAR> element 646a has a type attribute value of "uint16", a name attribute value of "DisplayUnits" and a comment attribute of "Display units for BP and MAP".

In the example embodiment, the software generator 520 interprets <VAR> element as representing a data variable (stored data) and the "type" attribute value "uint16" to be a data type of the data variable and the "name" attribute value "DisplayUnits" to be a name of the data variable. In response to inputting the <VAR> element 646a, the software generator 520 generates source code for the software object class named "CNIBPCStd" within the NIBP module, that allocates a data variable having a type attribute of "uint16" and a name (identifier) of "DisplayUnits". The data type value equal to "uint16" indicates that the associated data variable is an unsigned 16 bit integer.

The element tags 652a-652e are each named "ENUM" and each represent a <ENUM> element that is nested below the <ENUMERATIONS> element 650. Each <ENUM> element is defined with a type, name and default value and a description attribute. For example, the <ENUM> element 652a has a type attribute value of "DisplayUnits", a name attribute value of "NIBP_MMHG", a default value of "0" and a description attribute of "mmHg". In the example embodiment, the software generator 520 interprets <ENUM> element as representing a C++ enumeration type declaration and interprets the "type" attribute value "DisplayUnits" as the named data type of the enumeration type declaration and the "name" attribute value of "NIBP_MMHG" to be an enumeration type declaration member along with any other <ENUM> elements of the same type. In response to inputting the <ENUM> element 652a, the software generator 520 generates source code for the NIBP module that declares a enumeration data type having a type attribute of "DisplayUnits" and a name (identifier) of CNIBPDSTD_DISPLAYUNITS.

The source code generated for the NIBP module looks like this:

```
typedef enum CNBPCSTDtypDISPLAYUNITS {
   CNBPCSTD_DisplayUnits_NIBP_MMHG = 0,
   CNBPCSTD_DisplayUnits_NIBP_KPA,
   CNBPCSTD_DisplayUnits_MAX
} CNBPCSTD_DISPLAYUNITS;
```

FIG. 6E illustrates some of the XML element tags that are located one level below the <CNIBPDSTD_DEFINITION> 632 element of the <FAMILY_NIBP> element 616 of the set of directives 610 of FIG. 6A. As shown, elements named "STATIC_MEMBERS" 654 and "ENUMERATIONS" 660 are nested below <CNIBPDSTD_DEFINITION> 632 element. Elements named 'VAR" are nested below the <STATIC_MEMBERS> 654 element. Elements names "ENUM" are nested below the <ENUMERATIONS> 660 element.

The <CNIBPDSTD_DEFINITION> element 632 is defined with a class, abrv, version, family, genus and species attribute. The <CNIBPCSTD_DEFINITION> element 632 has a class attribute value of "CNIBPDStd", an abrv attribute of "CNBPDSTD", a version attribute of "105", a family attribute of "FmNIBP" a genus attribute of "GnDATA" and a species attribute of "SpSTANDARD".

In the example embodiment, the software generator 520 interprets the <CNIBPDSTD_DEFINITION> element 632 as representing a C++ software object class having a name of "CNIBPDStd". In response to inputting the <CNIBPDSTD_DEFINITION> element 632, the software generator 520 generates source code for the FmNIBP module that allocates a software object class named "CNIBPDStd".

In some embodiments, the invention provides for a method for communicating information between network elements in accordance with a set of directives. This method includes the steps of providing a first network element, installing a first communications software module onto said first network element that is configured to execute communications functionality according to a communications interface specification having a core portion and an extensible portion, the extensible portion is configured to incorporate a first set directives including one or more modules of directives.

The communications functionality performs actions that include receiving and transmitting a first set of message types that are configured to incorporate particular types and structures of data, and where the message types are defined by directives within the first set of one or more modules of directives. The steps also include operating the first communications software module to perform the actions.

The method further includes the steps of providing a second network element, installing a second communications software module onto the second network element, the second communications software module is configured to execute communications functionality according to the communications interface specification; and where the communications functionality performs actions that include receiving and transmitting a second set of message types that are configured to incorporate particular types and structures of data, the second set of message types incorporating the particular types and structures of data are defined by directives within a second set of directives, the second set of directives including one or more modules of directives; and where there is a complementary overlap between the first set of directives and the second set of directives. The steps also include operating the first communications software module to perform the actions.

Optionally, the first and second set of directives are expressed in Extensible Markup Language (XML). Preferably, the directives are both human and machine readable and not represented by source code so that the directives are independent of a particular programming language.

In some embodiments, the first communications software module is represented by a first set of source code and where the first set of directives are not represented by the source code and where a software generator program inputs the first set of directives and generates a substantial portion of the first set of source code in response to the directives.

In some embodiments a substantial portion of the first set of source code is expressed by an object oriented programming language and where the first set of source code is represented as one or more software object classes residing within a class hierarchy expressed in the object oriented programming language.

Optionally, the particular types and structures of data are expressed by an object oriented programming language and represented as one or more data only classes residing within a class hierarchy and where the class hierarchy has a structure that is expressed in the object oriented programming language. The data only classes are transformed into a binary sequence of data for transmission and reception by either of the first and second communications software modules. Optionally, the data only classes are transformed into an XML sequence of data for transmission and reception by either of the first and second communications software modules. An XML sequence can be stored into a file that is both human and machine readable.

Note that the complementary overlap is a circumstance where the first set of one or modules of directives and the second set of one or more modules of directives each include a common module of directives. In another circumstance, the complementary overlap is where the first set of one or more modules of directives includes a first module and the second set of one or more modules of directives includes a second module and where the first module is configured to transmit a set of message types, and the second module is configured to receive the transmit set of message types.

In some embodiments, the directives distinguish particular types and structures of data into one or more sets of data, and where the directives assign a version identifier and a location identifier within the one or more classes for each of the one or more sets of data. The communication software module is configured to extract a set of data having an associated earlier version, from one or more classes including one or more sets of data having an associated later version.

The invention can be applied to particular types and structures of data are employed in association with equipment that monitors and acquires data, for example within a health care environment. The data can represent aspects of physiology.

In another aspect, the invention provides a method for certifying compliance of software with respect to a communications protocol interface specification having a core portion and an extensible portion. The method includes the steps of providing a communications protocol interface specification having a core portion and an extensible portion, the core portion including a core set of communications protocol interface rules which are fixed and the extensible portion including an extensible set of communications protocol interface rules which are variable.

The steps also include providing a core portion of software which is configured to implement the core portion of the communications protocol interface specification and configured to be combined with an extensible portion of the software, and providing a set of extensible directives that specify the extensible set of communications protocol interface rules, and providing and operating a software generator program that is configured to input the set of extensible directives and to output the extensible portion of the software, the extensible portion of the software being in compliance with the extensible set of communications protocol interface rules which are variable, and combining the core portion of software and the extensible portion of the software to produce software that complies with the communications protocol interface specification, and that provides an interoperable and extensible communications network for employment within a health care or other type of environment.

In some embodiments, the extensible set of directives are expressed in Extensible Markup Language (XML). Optionally, the extensible set of directives define particular types and structures of data that are employed within a health care environment. In some embodiments, the extensible set of directives define particular types and structures of data that represent aspects of physiology.

In another aspect, the invention provides for a communications protocol interface configured to communicate particular types and structures of evolving data. In some embodiments, the invention includes a communications protocol interface specification that is configured to define a communications protocol interface and that has a core portion and an extensible portion, the core portion including a core set of communications protocol interface rules which are fixed and the extensible portion including an extensible set of communications protocol interface rules which are variable and which can further vary over time; and where the core portion defines a set of message types configured for transmitting and receiving data, command, error and status information, and where at least some of the message types include at least one variable sized field that is configured to carry the data and error information; and where the extensible portion is configured to define the data or error information having a particular type, structure and size that is subject to vary over time.

While the present invention has been explained with reference to the structure disclosed herein, it is not confined to the details set forth and this invention is intended to cover any modifications and changes as may come within the scope and spirit of the following claims.

What is claimed is:

1. A method for communicating information between network elements in accordance with a set of directives, including the steps of:

providing a first network element; and installing a first communications software module onto said first network element, said first communications software module is configured to execute communications functionality according to a communications interface specification having a core portion and an extensible portion, said extensible portion is configured to incorporate a first set of directives, said first set of directives including one or more modules of directives, where said communications functionality performs actions that include receiving and transmitting a first set of message types that are configured to incorporate particular types and structures of data, and where said message types incorporating said particular types and structures of data are defined by directives within said first set of directives; and operating said first communications software module to perform said actions;

where said particular types and structures of data are expressed by an object oriented programming language and represented as one or more data only object classes residing within a class hierarchy, said class hierarchy having a structure that is expressed in said object oriented programming language; and where said first communications software module is represented by a first set of source code of a programming language and where said first set of directives is not represented by a programming language and where a software generator program inputs said first set of directives and generates a portion of said first set of source code in response to said directives.

2. The method of claim 1 further including the steps of:
providing a second network element; and
installing a second communications software module onto said second network element, said second communications software module is configured to execute communications functionality according to said communications interface specification;
where said communications functionality performs actions that include receiving and transmitting a second set of message types that are configured to incorporate particular types and structures of data, said second set of message types incorporating said particular types and structures of data are defined by directives within a second set of directives, said second set of directives including one or more modules of directives; and
where there is an overlap between said first set of directives and said second set of directives; and operating said second communications software module to perform said actions.

3. The method of claim 2 where said first set of directives and said second set of directives include directives that are expressed in Extensible Markup Language (XML).

4. The method of claim 2 where said overlap is a circumstance where said first set of one or modules of directives and said second set of one or more modules of directives each include a common module of directives.

5. The method of claim 2 where said overlap is a circumstance where said first set of one or modules of directives includes a first module and said second set of one or more modules of directives includes a second module and where said first module is configured to transmit a set of message types, and where said second module is configured to receive said set of message types.

6. The method of claim 1 where a portion of said first set of source code is expressed by an object oriented programming language and where said first set of source code is represented as one or more software object classes residing within a class hierarchy expressed in said object oriented programming language.

7. The method of claim 6 where said first set of directives distinguish particular data by a chronology of their definition within a particular module in order to indicate data having an associated earlier version from data having an associated later version.

8. The method of claim 7 where said communication software module is configured to extract data having an associated earlier version, from one or more software object classes including data having an associated later version.

9. The method of claim 1 where said data only classes are transformed into a binary sequence of data for transmission and reception by either of said first and second communications software modules.

10. The method of claim 1 where said data only classes are transformed into an XML sequence of data for transmission and reception by either of said first and second communications software modules.

11. The method of claim 1 where said particular types and structures of data are employed in association with equipment that monitors and acquires data.

12. The method of claim 1 where said particular types and structures of data are employed within a health care environment.

13. The method of claim 1 where said particular types and structures of data represent aspects of physiology.

14. A method for communicating data that conforms to an evolving data definition, including the steps of:
providing a first network element operating as a client;
providing a first communications software module that is configured to identify, receive and transmit a first set of message types, and where each of said message types is selected as a member of said first set and configured to incorporate particular types and structures of data based upon of directives specified in accordance with said first portion of said first version of said evolving data definition, where at least one portion of said evolving data definition is represented as a class residing within a class hierarchy that includes other portions of said evolving data definition, and where said first communications software module is represented by a first set of source code of a programming language and where said evolving data definition is not represented by a programming language and where a software generator program inputs said evolving data definition and generates a portion of said first set of source code in response to said evolving data definition; and
operating, by a communication device, said first communications software module in association with said first network element.

15. The method of claim 14 further including the steps of:
providing a second network element operating as a server;
providing a second communications software module that is configured to identify, receive and transmit a second set of message types, and
where each of said message types is selected as a member of said second set and configured to incorporate particular types and structures of data based upon of directives specified in accordance with said second portion of said second version of said evolving data definition; and
operating said second communications software module in association with said second network element to communicate with said first network element.

16. The method of claim 14 where said directives of said evolving data definition are expressed as extended markup language (XML).

17. The method of claim 14 where said directives specified in accordance with said first portion of said first version of said evolving data definition are included within a data description sheet.

18. The method of claim 14 where information obtained in accordance with said evolving data definition is transformed into a binary sequence of data for transmission and reception by either of said first and second communications software modules.

19. The method of claim 14 where said first version has an associated first version time value and where said second version has an associated second version time value and where said first version time value is equal to or earlier than said second version time value.

20. The method of claim 14 where a version of said evolving data definition has an associated set of one or more data members and where each data member of said associated set has an identifiable location that is distinguishable from locations of other data members associated with other versions of said evolving data definition.

21. The method of claim 20 where each of said data members of said associated set is assigned a set of one or more associated versions.

22. The method of claim 21 where an earlier version of said evolving data definition is extracted from a later version of said evolving data definition by copying data members that are associated with said prior version from said evolving data definition.

23. A system for communicating information between network elements in accordance with a set of directives, including:
- a plurality of network elements that each includes a communication device having a processor executing code to create a first communications software module that is configured to execute communications functionality according to a communications interface specification having a core portion and an extensible portion, said extensible portion is configured to incorporate a first set directives that includes one or more modules of directives; and
- where said communications functionality performs actions that include receiving and transmitting a first set of message types that are configured to incorporate particular types and structures of data,
- where said particular types and structures of data are expressed by an object oriented programming language and represented as one or more data only object classes residing within a class hierarchy, said class hierarchy having a structure that is expressed in said object oriented programming language,
- where said message types incorporating said particular types and structures of data are defined by directives within said first set of one or more modules of directives; and
- where said first communications software module is represented by a first set of source code of a programming language and where said first set of directives is not represented by a programming language and where a software generator program inputs said first set of directives and generates a portion of said first set of source code in response to said directives; and
- one or more communications channels that are each configured to provide communication between each of said network elements.

* * * * *

UNITED STATES PATENT AND TRADEMARK OFFICE
CERTIFICATE OF CORRECTION

PATENT NO.         : 8,543,999 B2
APPLICATION NO.    : 11/663395
DATED              : September 24, 2013
INVENTOR(S)        : DelloStritto et al.

Page 1 of 1

It is certified that error appears in the above-identified patent and that said Letters Patent is hereby corrected as shown below:

In the Claims

Col. 33, line 25, claim 4, "one or modules" should read --one or more modules--

Col. 33, line 29, claim 5, "one or modules" should read --one or more modules--

Col. 34, line 9, claim 14, "upon of directives" should read --upon directives--

Col. 34, line 33, claim 15, "upon of directives" should read --upon directives--

Signed and Sealed this
Fourth Day of February, 2014

Michelle K. Lee
*Deputy Director of the United States Patent and Trademark Office*